United States Patent [19]
Takada et al.

[11] Patent Number: 5,814,808
[45] Date of Patent: Sep. 29, 1998

[54] OPTICAL DISPLACEMENT MEASURING SYSTEM USING A TRIANGULATION INCLUDING A PROCESSING OF POSITION SIGNALS IN A TIME SHARING MANNER

[75] Inventors: Yuji Takada, Kyoto; Hiroshi Matsuda; Takayuki Nishikawa, both of Hirakata, all of Japan

[73] Assignee: Matsushita Electric Works, Ltd., Osaka, Japan

[21] Appl. No.: 703,787

[22] Filed: Aug. 27, 1996

[30] Foreign Application Priority Data

Aug. 28, 1995 [JP] Japan ................................. 7-219332
May 28, 1996 [JP] Japan ................................. 8-157679
May 28, 1996 [JP] Japan ................................. 8-157680

[51] Int. Cl.$^6$ ................................................. G01C 3/06
[52] U.S. Cl. ......................... 250/206.1; 250/201.4; 250/201.6; 356/3.01; 356/4.01; 396/98; 396/106; 396/120
[58] Field of Search ......................... 250/206.1, 206.2, 250/201.6, 201.4, 201.2, 559.31, 559.23, 214 AG, 214 R, 204, 222.1, 22.1; 356/3.01, 3.04, 3.06, 383, 384, 215, 356, 376, 381, 4.01, 4.06, 4.07; 396/106, 108, 96, 98, 120

[56] References Cited

U.S. PATENT DOCUMENTS

| | | | |
|---|---|---|---|
| 4,758,082 | 7/1988 | Kozuki et al. | 356/1 |
| 4,761,546 | 8/1988 | Ikari et al. | 250/201 |
| 4,855,585 | 8/1989 | Nonaka | 250/206.1 |
| 5,047,793 | 9/1991 | Shiomi | 396/106 |
| 5,107,449 | 4/1992 | Ikuta | 364/561 |
| 5,128,529 | 7/1992 | Nagaoka et al. | 250/206.1 |
| 5,148,011 | 9/1992 | Taka | 250/206.1 |
| 5,157,435 | 10/1992 | Min et al. | 396/101 |
| 5,351,126 | 9/1994 | Takada et al. | 356/376 |
| 5,444,511 | 8/1995 | Seki et al. | 396/99 |
| 5,572,012 | 11/1996 | Saito et al. | 250/201.6 |

OTHER PUBLICATIONS

Patent Abstracts of Japan, vol. 014, No. 340 (P–1080) & JP 02 118408A, May 2, 1990.
Patent Abstracts of Japan, vol. 010, No. 157 (P–464) & JP 61 010711 A, Jun. 27, 1984.
Patent Abstracts of Japan, vol. 014, No. 001 (P–985) & JP 01 254 807 A, Oct. 11, 1989.
Patent Abstracts of Japan, vol. 010, No. 294 (P–504) & JP 61 112902 A, Nov. 7, 1984.

*Primary Examiner*—Edward P. Westin
*Assistant Examiner*—John R. Lee
*Attorney, Agent, or Firm*—Armstrong, Westerman, Hattori, McLeland & Naughton

[57] ABSTRACT

An optical displacement measuring system using a triangulation comprises a light projecting unit for emitting to an object a light beam which is amplitude-modulated by a reference signal having a predetermined period, a light receiving unit for receiving light reflected back from the object and providing a pair of position signals, and a control signal generator for providing first and second control signals in synchronism with the reference signal. The position signals are processed by a switching unit in a time sharing manner according to the first control signal to obtain a first composite signal, in which the position signals occur alternately every integral number of the period of the reference signal. The first composite signal is amplified by a single amplifier at a desired amplification rate, and then sent to a distance determining unit, in which the polarity of the first composite signal is periodically reversed according to the second control signal to obtain a second composite signal, and a distance signal indicative of a distance between the light projecting unit and the object is determined from the second composite signal.

24 Claims, 18 Drawing Sheets

OPTICAL DISPLACEMENT MEASURING SYSTEM USING A TRIANGULATION INCLUDING A PROCESSING OF POSITION SIGNALS IN A TIME SHARING MANNER

BACKGROUND OF THE INVENTION

1. Field of the Invention

The invention relates to an optical displacement measuring system for optically measuring a displacement of an object from a standard position according to a triangulation.

2. Disclosure of the Prior Art

In the past, various types of optical displacement measuring systems have been proposed to determine a displacement of an object from a standard position according to a triangulation. For example, U.S. Pat. No. 4,761,546 discloses an optical displacement measuring system shown in FIG. 18. That is, the system comprises a light projecting unit 1E for emitting a light beam to an object OBJ and light receiving unit 2E for receiving light reflected back from the object OBJ. A photodiode 13E is turned ON to emit the light beam by a driver circuit 12E receiving an output of an oscillator 1E. The oscillator 10E generates a clock pulse for setting timing of light emission. The reflected light makes a light spot on a position sensitive device 21E (which shall be referred to hereinafter as "PSD") to generate a pair of position signals $I_1$ and $I_2$. Since a ratio of the position signal $I_1$ to the position signal $I_2$ is varied in response to a position of the light spot on the PSD 21E, an operation of determining a distance between the light projecting unit 1E and object OBJ can be performed on the basis of the position signals $I_1$ and $I_2$ by an operational unit 3E. The operational unit 3E includes light receiving circuits 31E and 34E which amplify the respective position signals $I_1$ and $I_2$ and convert them to voltage signals. The ratio of the position signal $I_1$ to the position signal $I_2$ is maintained even after being converted to the voltage signals. The light receiving circuits 31E and 34E are respectively connected to level detecting circuits 32E and 35E which receive the clock pulse from the oscillator 10E and discriminate the levels of the position signals $I_1$ and $I_2$ in synchronism with the clock pulse. Outputs of the level detecting circuits 32E and 35E are then sent to a subtraction circuit 33E to provide a first operational signal $I_1-I_2$. On the other hand, the outputs of the level detecting circuits 32E and 35E are also sent to a correcting adder circuit 36E to provide a second operational signal $I_1+k\times I_2$ (k: a constant for nonlinearity correction). The first and second operational signals are sent to a divider circuit 37E to provide a third operational is signal $(I_1-I_2)/(I_1+k\times I_2)$ which is a distance signal indicative of the distance between the light projecting unit 1E and the object OBJ.

However, there is room for further improvement in this optical displacement measuring system. That is, the operational unit 3E has two operation lines for the respective signals $I_1$ and $I_2$, in each of which the light receiving circuit (31E and 34E) having the amplifier and the level detecting circuit (32E and 35E) are used. To accurately determine the distance between the projecting unit 1E and the object OBJ, it is required that the light receiving circuit 31E and the level detecting circuit 32E of one operational line is the same characteristics as those (34E and 35E) of the other operational line. However, for example, a gain difference will be caused by variations with respect to time, temperature, and frequency characteristics, between the amplifiers used in the light receiving circuits 31E and 34E. The gain difference results in an error in the output of the operational unit 3E, therefore, there is a possibility to causing a problem in respect of the accuracy of measurement. In addition, since two sets of the light receiving unit (31E and 34E) and the level detecting circuit (32E and 35E) are used in the operational unit 3E, there causes another problem that a price of the optical displacement measuring system is increased.

SUMMARY OF THE INVENTION

In view of this respect, a primary object of the present invention is to provide an optical displacement measuring system for determining a displacement of an object from a standard position with an improved accuracy of measurement according to a triangulation. The system comprises a light projecting unit for emitting a light beam, which is amplitude-modulated by a reference signal having a predetermined period, to an object, a light receiving unit for receiving light reflected by the object and providing a pair of first and second position signals, and a control signal generator for providing first and second control signals in synchronism with the reference signal. The first and second position signals are processed by a first switching unit in a time sharing manner according to the first control signal to obtain a first composite signal, in which the first and second position signals occur alternately every integral number of the period of the reference signal. The first composite signal is amplified by a single amplifier at a desired amplification rate, and then sent to a distance determining unit. In the distance determining unit, the polarity of the first composite signal is periodically reversed according to the second control signal so as to obtain a second composite signal, and a distance between the light projecting unit and the object is determined from the second composite signal. Since the first and second position signals are processed by the first switching circuit to obtain the first composite signal, it is sufficient to use only one amplifier in the present system without using two amplifiers for the respective position signals. Therefore, it is possible to eliminate the occurrence of errors caused by variations of characteristics between the amplifiers, to thereby improve the accuracy of measurement.

By the way, the light receiving unit receives in practical use the influence of a disturbance light such as sunlight or light of a fluorescent lamp. Therefore, noise components resulting from the disturbance light may be included in the position signals. To accurately determine the distance between the light projecting unit and the object, such noise components must be removed from the original position signals. In the present invention, the noise components can be separated from the position signals by using the light beam amplitude-modulated by the reference signal to obtain the position signals from the light receiving unit, and processing the position signals according to the first and second control signals in synchronism with the reference signal.

In a preferred embodiment of the present invention, the distance determining unit comprises a detector for processing the first composite signal according to the second control signal to polarity-reversing the first composite signal every half period of the reference signal to obtain the second composite signal, a second switching unit for dividing the second composite signal into a pair of third and fourth position signals according to the first control signal, and a first operating unit for determining the distance between the light projecting unit and the object by using the third and fourth position signals. Since the first and second position signals are processed by the first switching circuit to obtain the first composite signal, it is sufficient to use only one detector in the present system without using two detectors for processing the first and second position signals, respectively. Therefore, it is possible to eliminate the occurrence of errors caused by variations of characteristics between the detectors, to thereby improve the accuracy of measurement.

In addition, when the first operating unit outputs a light energy signal indicative of an amount of light energy received by the light receiving unit, it is preferred that the distance determining unit further comprises a comparing unit for comparing the light energy signal with a constant value to provide an analog output signal indicative of a difference therebetween, and a feed-back control unit for controlling at least one of the amplification rate of the amplifier and a light output of the light projecting unit according to the output signal of the comparing unit such that the light energy signal is maintained at the constant value. Since the light energy signal can be maintained at the constant value by the feed-back control unit, it is possible to simplify components parts of the first operating unit. In particular, it is preferred that the feed-back control unit provides a first feed-back control signal to the amplifier to increase the amplification rate when the light energy signal is smaller than the constant value, and provides a second feed-back control signal to the light projecting unit to reduce the light output when the light energy signal is larger than the constant value. Since the feed-back control unit controls adequate one of the amplifier and the light projecting unit upon the output signal of the comparing unit, it is possible to provide a wide dynamic range with respect to reflectance of the object. That is, when the object is a relatively low reflectance, the amplification rate of the amplifier is increased by the feed-back unit to maintain the light energy signal at the constant value. On the other hand, when the object is a relatively high reflectance, the light output of the light projecting unit is reduced by the feed-back unit to maintain the light energy signal at the constant value.

Moreover, it is preferred to use a second operating unit for providing the second position signal and a first operation signal indicative of a difference between the first and second position signals. The second operating unit is disposed between the light receiving unit and the first switching unit so that the second position signal and the is first operation signal are processed by the first switching unit in the time sharing manner according to the first control signal to obtain the first composite signal. Since the first and second position signals are processed by the second operating unit before being sent to the first switching unit, common noise components, in other words, inphase noise components, in the first and second position signals can be removed, so that the accuracy of measurement is improved. When the second operating unit is used in the present system, it is preferred to use the first operating unit comprising a first low-pass filter for integrating the third position signal, a second low-pass filter for integrating the fourth position signal, an adder circuit for calculating a sum of outputs of the first and second low-pass filters to obtain a second operation signal, multiplying the output of the second low-pass filter by a correction constant to obtain a third operation signal, and adding the second operation signal to the third operation signal to obtain a fourth operation signal, and a divider circuit for dividing the output of the first low-pass filter by the fourth operation signal to obtain a fifth operation signal, from which the distance between the light projecting means and the object is determined.

When the first and second position signals are current signals, it is preferred that the displacement measuring system comprises a current/voltage converter disposed between the light receiving unit and the first switching unit to convert the current signals to corresponding voltage signals. When the first and second current signals are converted to voltage signals before being input to the first switching unit, there is an advantage that the voltage signals are difficult to receive the influence of switching noises unavoidably generated by the first switching unit.

These and still other objects and advantages will become apparent from the following description of the preferred embodiments of the invention when taken in conjunction with the attached drawings.

DISCLOSURE OF THE PREFERRED EMBODIMENTS

First Embodiment

Figure 1:
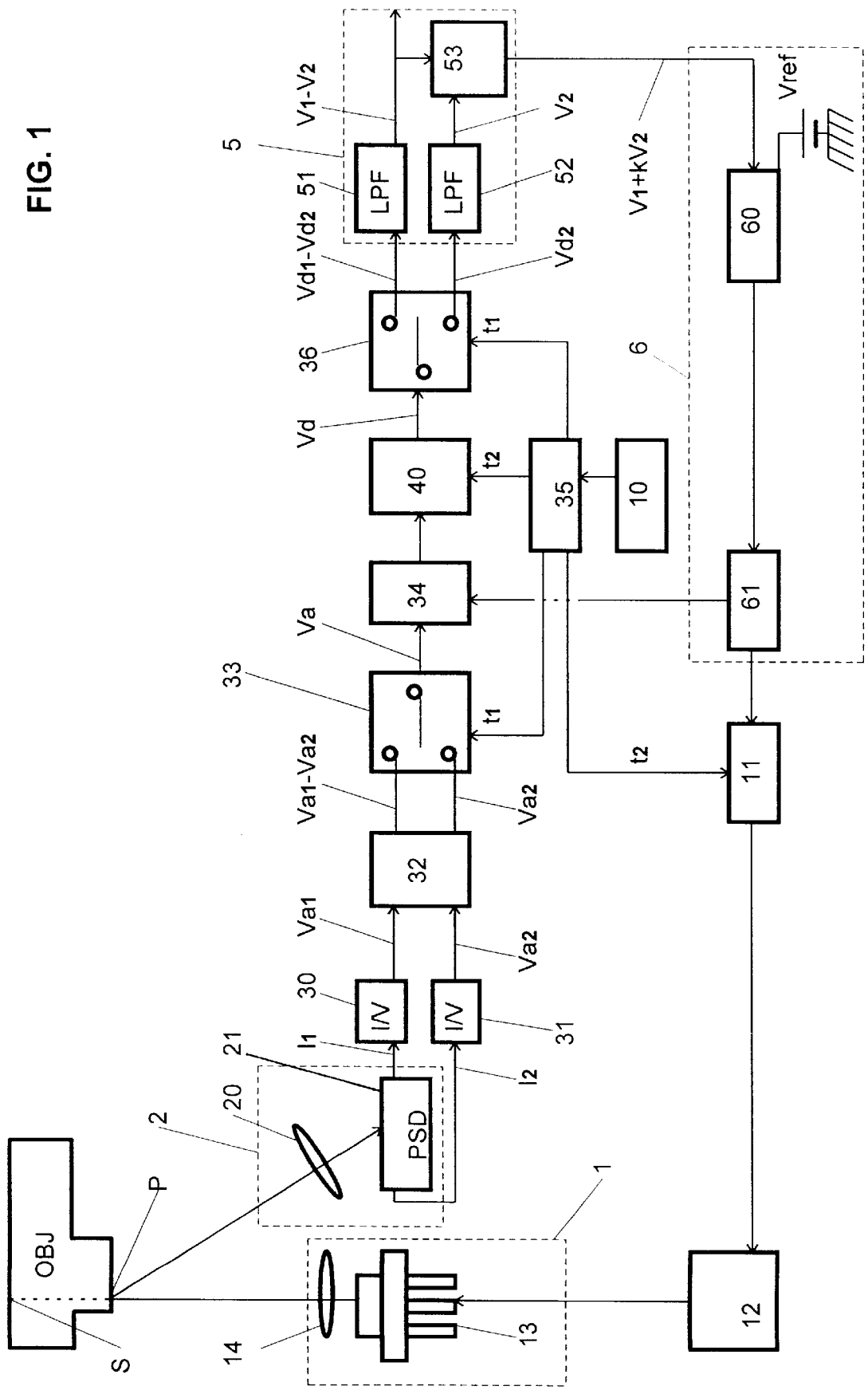
FIG. 1 is a block circuit diagram of an optical displacement measuring system of a first embodiment of the present invention.
Figure 2:
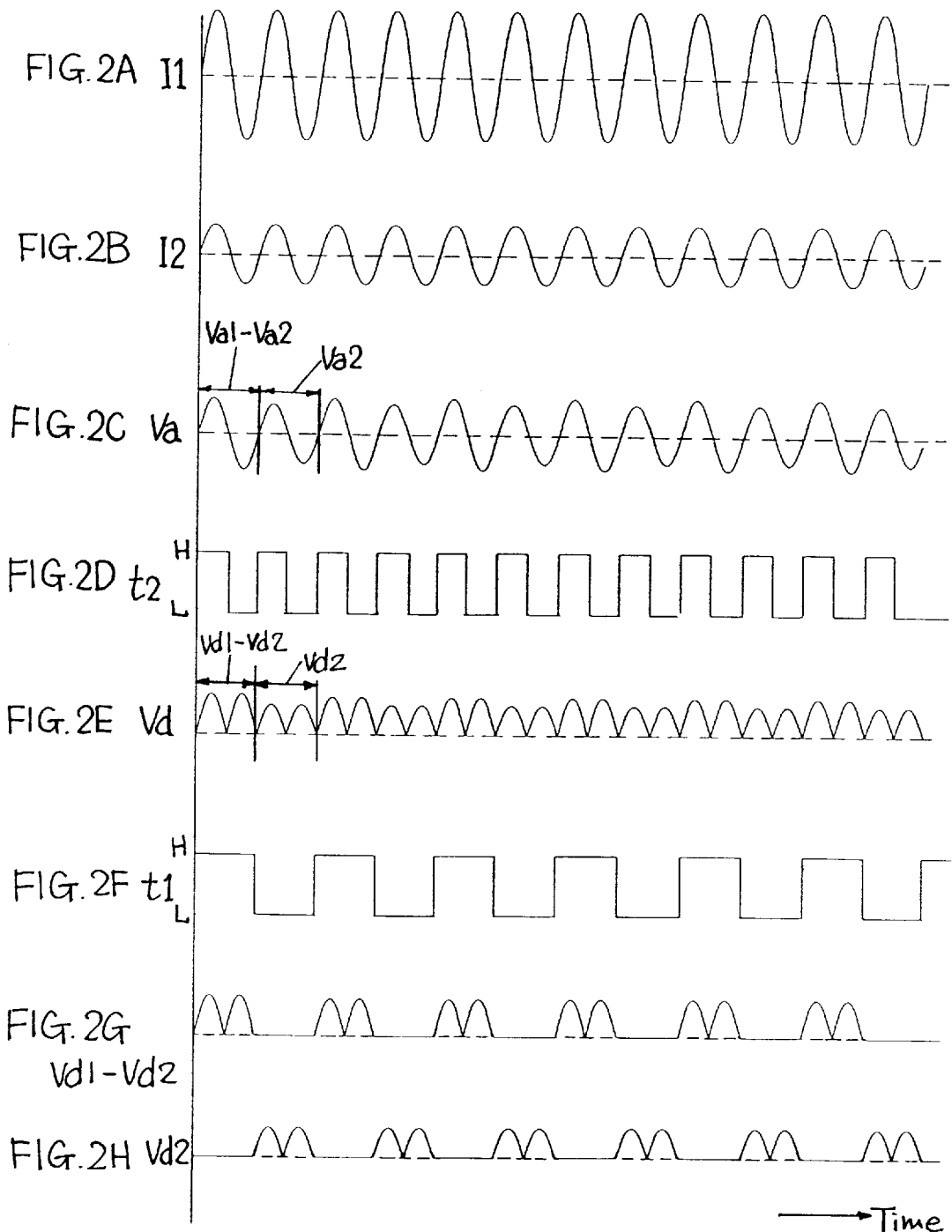
FIGS. 2A to 2H show waveforms explaining operations performed in the circuit diagram of FIG. 1.

As shown in FIG. 1, an optical displacement measuring system of the first embodiment comprises a light projecting unit 1 for emitting a laser beam, which is amplitude-modulated by a reference signal having a predetermined period, to an object OBJ, and a light receiving unit 2 for receiving light reflected back from the object. The projecting unit 1 includes a laser diode 13 and a first lens 14. The period of the reference signal can be determined in a range of 10 kHz to 200 kHz. Therefore, a light output of the modulated laser beam is varied with respect to time. The reference signal is generated by an oscillator 10, and then sent to a control signal generator 35 to output a control signal $t_2$ in synchronism with the reference signal, as shown in FIG. 2G. In this embodiment, the period of the reference signal is equal to that of the control signal $t_2$. The control signal $t_2$ is input as a carrier to a modulator 11 at which an amplitude modulation of the carrier is performed according to an output of a feed-back unit 6 explained later. Therefore, a peak-to-peak amplitude of the modulated laser beam can be adjusted in response to the output of the feed-back unit 6. However, when the feed-back unit 6 is not used, the reference signal may be directly sent from the oscillator 10 to a laser-diode driving circuit 12 to emit the modulated laser beam from the laser diode 13. An output of the modulator 11 is sent to the laser-diode driving circuit 12 to emit the modulated laser beam from the laser diode 13. The emitted laser beam makes a light spot P on the object OBJ.

The receiving unit comprises a second lens 20 and position sensitive device 21 (PSD) for receiving the reflected light from the light spot P. When the PSD 21 receives the reflected beam through the second lens 20, it provides a pair of position signals $I_1$ and $I_2$, as shown in FIG. 2A and 2B. The PSD 21 is a semiconductor element having a "pin" structure which has a common electrode and a pair of electrodes disposed at opposite ends of a light sensitive surface of the PSD 21. An electric resistance between the electrodes is divided by a position of a light spot formed on the light sensitive surface. When a constant current is supplied to the common electrode, the electrodes of the PSD 21 respectively output the position signals $I_1$ and $I_2$. Since an amplitude ratio of the position signal $I_1$ to the position signal $I_2$ is varied depending on a position of the light spot on the PSD 21, a displacement between the light spot P on the object OBJ and a standard position S can be determined by the use of the position signals $I_1$ and $I_2$. The standard position S is on the axis of the laser beam emitted from the laser diode 13, as shown in FIG. 1, and can be determined such that light reflected back from the standard position S is received at the center of an effective length of the PSD 21. In place of the displacement between the light spot P and the standard position S, it is possible to determine a distance between the light spot P on the object OBJ and the first lens 14. A period of each of the position signals $I_1$ and $I_2$ is equal to the period of the control signal $t_2$.

Since the position signals $I_1$ and $I_2$ are current signals, they are converted into voltage signals $Va_1$ and $Va_2$ by I/V converters 30 and 31, respectively. The voltage signals $Va_1$ and $Va_2$ are sent to a first operating unit 32 at which a difference between the signals $Va_1$ and $Va_2$ is calculated. As a result, the first operating unit 32 outputs the signal $Va_2$ and a first operation signal $Va_1-Va_2$. The signals $Va_1-Va_2$ and $Va_2$ are processed by a first switching circuit 33 in a time sharing manner according to a first control signal $t_1$ to obtain a first composite signal Va in which the signals $Va_1-Va_2$ and $Va_2$ occur alternately every one period of the reference signal, as shown in FIG. 2C. That is, one-period component of the signal $Va_1-Va_2$ is extracted at a level H of the control signal $t_1$, and on the other hand one-period component of the signal $Va_2$ is extracted at a level L of the control signal $t_1$. The first control signal $t_1$ is generated by the control signal generator 35, and sent to the first switching circuit 33. Since the first control signal $t_1$ is synchronized with the reference signal, the first composite signal of FIG. 2C can be obtained. In this embodiment, the period of the control signal $t_1$ is two times as long as the period of the control signal $t_2$.

The first composite signal Va is amplified by an amplifier 34 at a desired amplification rate, and then is input into a detector 40. In the detector 40, the first composite signal Va is processed according to the control signal $t_2$ to obtain a second composite signal Vd, in which the first composite signal Va is polarity-reversed every half period of the reference signal, as shown in FIG. 2E. That is, the polarity of the first composite signal Va is not reversed at a level H of the control signal $t_2$ shown in FIG. 2D, but is reversed at a level L of the control signal $t_2$.

The second composite signal Vd is divided into a pair of pulse signals $Vd_1-Vd_2$ and $Vd_2$ according to the control signal $t_1$ by a second switching circuit 36, as shown in FIGS. 2G and 2H. That is, only signal component $Vd_1-Vd_2$ of the second composite signal Vd is extracted at the level H of the control signal $t_1$, and only signal component $Vd_2$ of the second composite signal Vd is extracted at the level L of the control signal $t_1$. The pulse signals $Vd_1-Vd_2$ and $Vd_2$ are sent to a second operating unit 5. The second operating unit 5 comprises a first low-pass filter 51 for integrating the pulse signal $Vd_1-Vd_2$ to provide a signal $V_1-V_2$, a second low-pass filter 52 for integrating the pulse signal $Vd_2$ to provide a signal $V_2$, and an adder circuit 53 for calculating an operational signal $V_1+k\times V_2$ by using the signals $V_1-V_2$ and $V_2$. The value k is a constant for nonlinearity correction. A distance signal indicative of the displacement between the light spot P on the object OBJ and the standard position S is given by dividing the signal $V_1-V_2$ by the operational signal $V_1+k\times V_2$. In this embodiment, since the operational signal $V_1+k\times V_2$ can be maintained at a constant value by the feed-back unit 6, only the signal $V_1-V_2$ provided from the low-pass filter 51 can be used as the distance signal. However, when the feedback unit 6 is not used, a divider circuit for dividing the signal $V_1-V_2$ by the operational signal $V_1+k\times V_2$ is necessary to obtain the distance signal.

The output $V_1+k\times V_2$ of the adder circuit 53 means a total amount of light energy received by the PSD 21. The output $V_1+k\times V_2$ of the adder circuit 53 is compared with a reference voltage Vref by an error amplifier 60 to provide an analog voltage signal indicative of a difference between an amount of light energy determined by the reference voltage Vref and the amount of light energy actually received by PSD 21. According to the analog voltage signal of the error amplifier 60, the light output of the modulated laser beam emitted from the laser diode 13 and the amplification rate of the amplifier 34 are controlled by a feed-back control circuit 61 such that the actual light energy is maintained at the reference light energy. That is, the light output and the amplification rate are controlled in a feed-back manner such that when the actual light energy is smaller than the reference light energy, the amplification rate is increased, and when the actual light energy is larger than the reference light energy, the light output is decreased.

Figure 3:
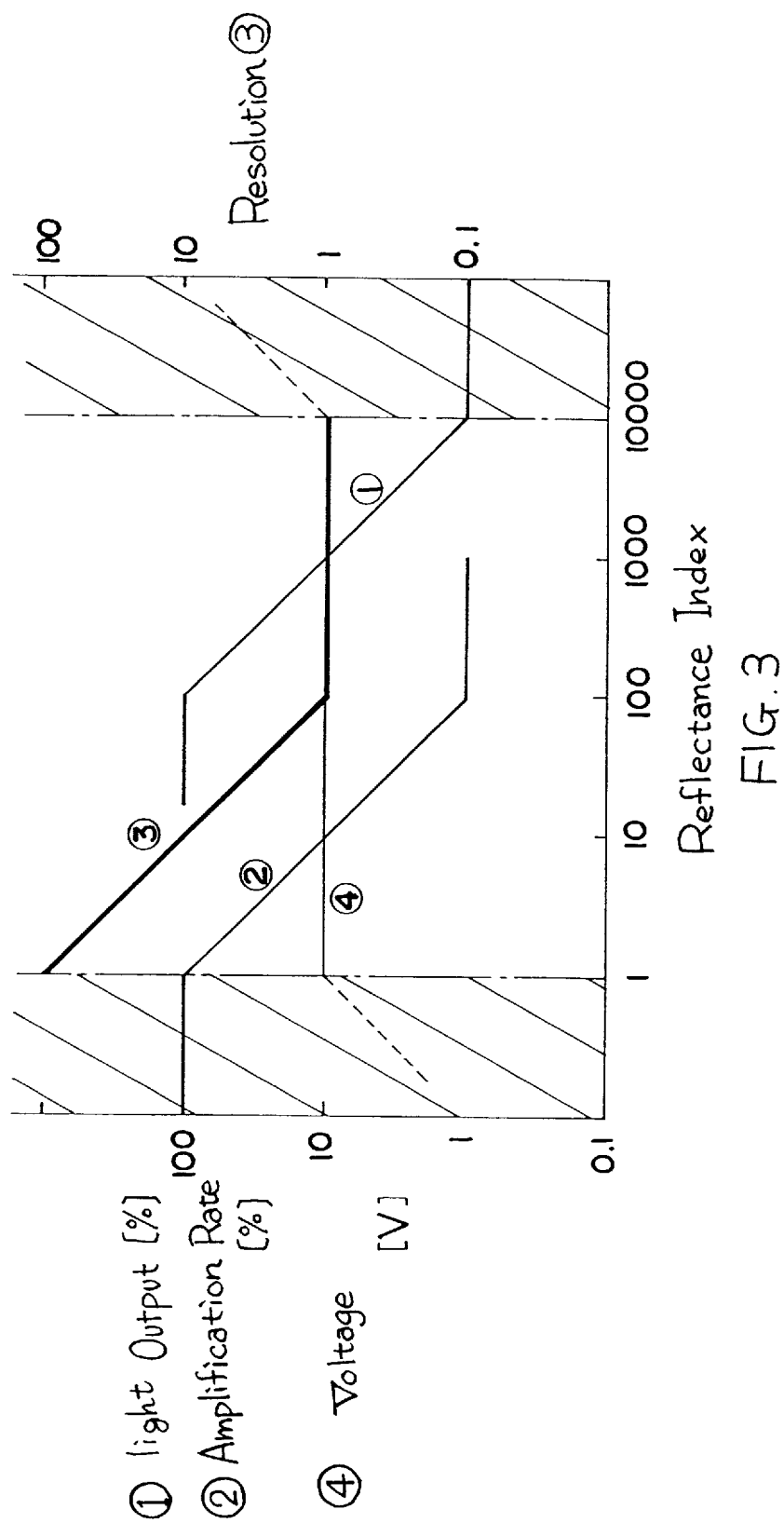
FIG. 3 is a diagram for understanding how a feed-back control unit works in the system of FIG. 1.

Referring to FIG. 3, the feed-back manner is explained in detail. Adjustable ranges of the light output of the modulated laser beam and the amplification rate are in a range of 1% to 100%, respectively. Reflectance index is defined herein to be 100 when the PSD 21 receives a predetermined intensity of light reflected from a standard object, e.g., a white ceramic, which is located at fixed distances from the light projecting unit 1 as well as the light receiving unit 2. In addition, when the reflectance index is 100, the light output of the modulated laser beam and the amplification rate are adjusted to 100% and 1%, respectively. In this situation, as the reflectance index is larger than 100, the light output of the modulated laser beam is reduced, as shown by the line ① of FIG. 3. In other words, when the reflectance index is larger than 100, the peak-to-peak amplitude of the modulated laser beam is reduced to control the amount of light energy received by the PSD 21. On the other hand, as the reflectance index is smaller than 100, the amplification rate is increased, as shown by the line ② of FIG. 3. As described before, since each of the light output and the amplification rate can be varied within the range of 100 magnifications, it is possible to obtain a wide dynamic range of 10000 (100× 100) with respect to the reflectance index. In FIG. 3, the line ③ designates a resolution of the optical displacement measuring system, and the line ④ designates a voltage value corresponding to the amount of light energy received by the PSD 21. The voltage value is maintained constant within a range of the reflectance index of 1 to 10000. In the above explanation, a standard value the reflectance index is set at 100, however, it may be adequately set, if necessary. For example, when an object to be measured has a relatively low reflectance, the standard value of the reflectance index may be set at 10, so that the feed-back manner is available within a range of the reflectance index of 0.1 to 1000.

In this embodiment, the signals $Va_1-Va_2$ and $Va_2$ are processed by the first switching circuit 33 according to the first control signal $t_1$ to is obtain the first composite signal Va in which the signals $Va_1-Va_2$ and $Va_2$ occur alternately every one period of the reference signal. However, it is possible to process the signals $Va_1-Va_2$ and $Va_2$ according to another control signal in synchronism with the reference signal such that the signals $Va_1-Va_2$ and $Va_2$ occur alternately every integral number of the reference signal in a first composite signal.

Second Embodiment

Figure 4:
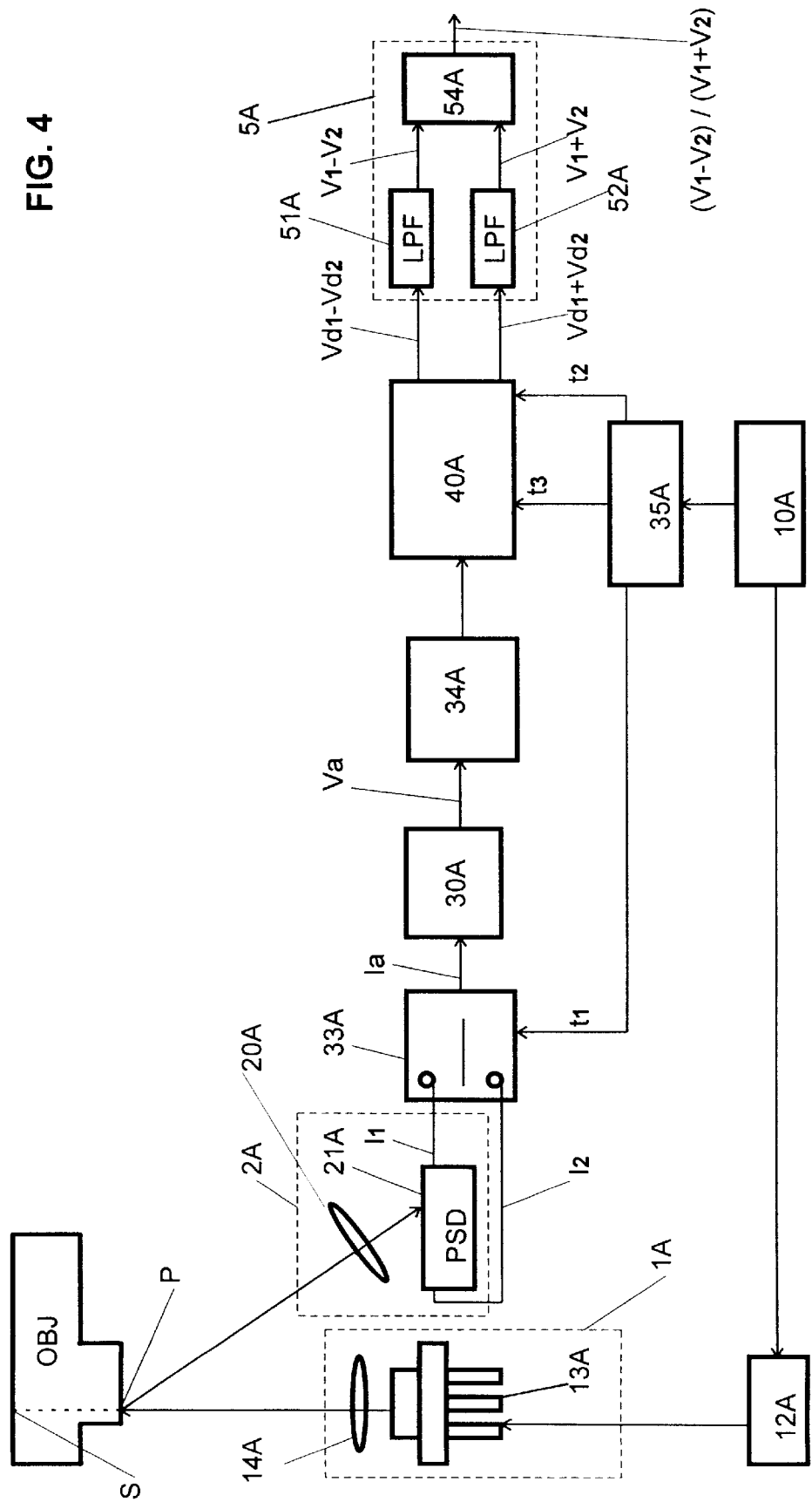
FIG. 4 is a block circuit diagram of an optical displacement measuring system of a second embodiment of the present invention.

As shown in FIG. 4, an optical displacement measuring system of the second embodiment comprises a light projecting unit 1A for emitting a laser beam, which is amplitude-modulated by a reference signal having a predetermined period, to an object OBJ, and a light receiving unit 2A for receiving light reflected back from the object OBJ. The projecting unit 1A includes a laser diode 13A and a first lens 14A. The reference signal is generated by an oscillator 10A, and then sent to a laser-diode driving circuit 12A to emit the modulated laser beam from the laser diode 13A. The modulated laser beam makes a light spot P on the object OBJ.

Figure 5:
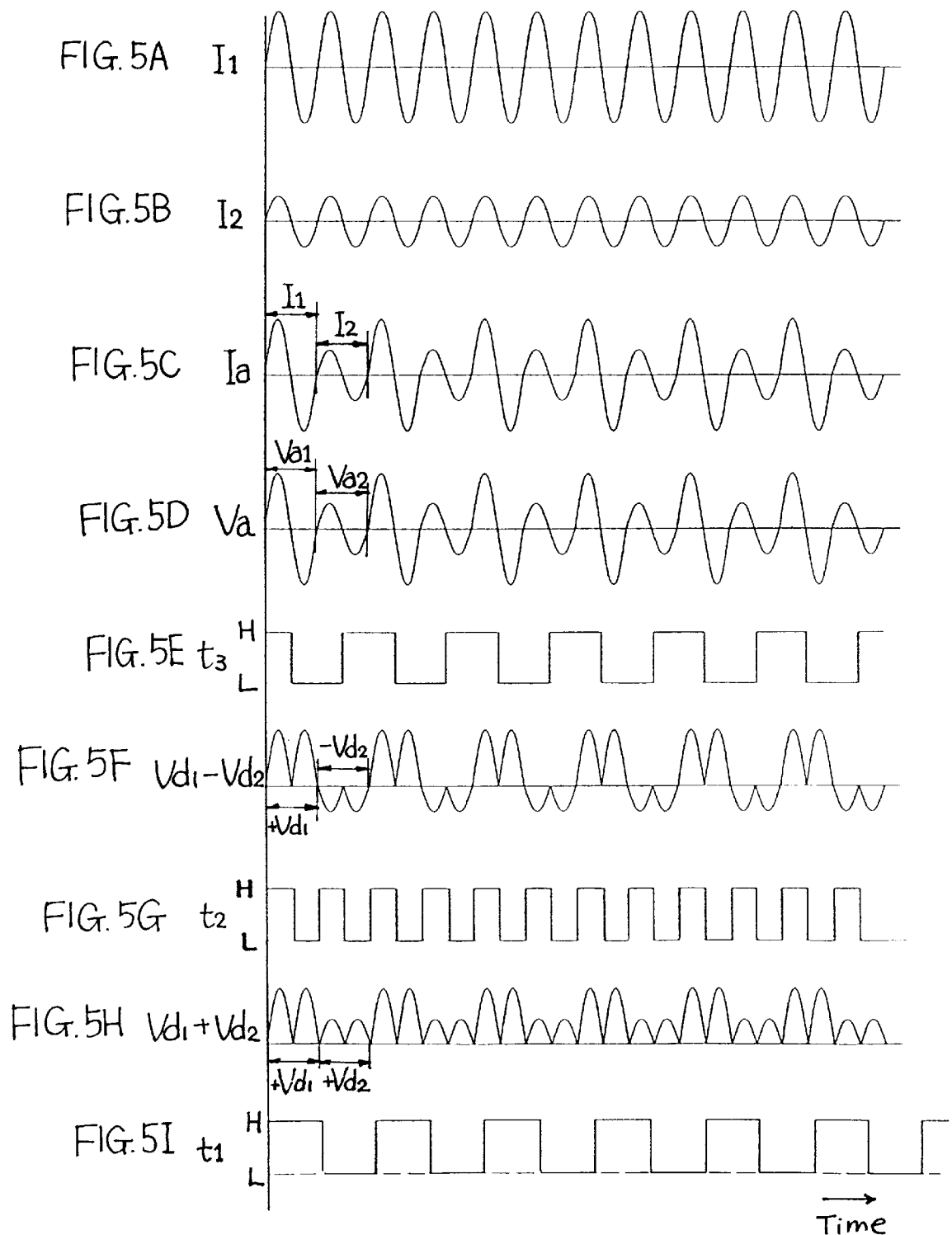
FIGS. 5A to 5I show waveforms explaining operations performed in the circuit diagram of FIG. 4.

The receiving unit 2A comprises a second lens 20A and a position sensitive device 21A (PSD) for receiving the reflected light from the light spot P. When the PSD 21A receives the reflected beam through the second lens 20A, it provides a pair of position signals $I_1$ and $I_2$, as shown in FIG. 5A and 5B. A period of each of the position signals $I_1$ and $I_2$ is equal to the period of the reference signal.

The position signals $I_1$ and $I_2$ are processed by a switching circuit 33A in a time sharing manner according to a first control signal $t_1$ in synchronism with the reference signal to obtain a first composite signal Ia in which the signals $I_1$ and $I_2$ occurs alternately every one period of the reference signal, as shown in FIG. 5C. That is, one-period component of the signal $I_1$ is extracted at a level H of the control signal $t_1$ shown in FIG. 5I, and on the other hand, one-period component of the signal $I_2$ is extracted at a level L of the control signal $t_1$. The control signal $t_1$ is provided from a control signal generator 35A which is connected to the oscillator 10A. Since the first control signal $t_1$ is synchronized with the reference signal, the first composite signal Ia shown in FIG. 5C can be obtained. In this embodiment, the period of the control signal $t_1$ is two times as long as the period of the reference signal.

Since the first composite signal Ia is a current signal, it is converted into a voltage signal Va by an I/V converter 30A. Therefore, the signal Va is a composite voltage signal, in which signal components $Va_1$ and $Va_2$ occur alternately every one period of the reference signal, as shown in FIG. 5D. The signal Va is amplified by an amplifier 34A at a desired amplification rate, and then is sent to a detector 40A. By the detector 40A, the composite signal Va is processed according to a control signal $t_2$ in synchronism with the reference signal such that the composite signal Va is polarity-reversed every half period of the reference signal to obtain a second composite signal, as shown in FIG. 5H. That is, the polarity of the composite signal Va is not reversed at a level H of the control signal $t_2$ shown in FIG. 5G, but is reversed at a level L of the control signal $t_2$. The control signal $t_2$ is provided from the control signal generator 35A. In this embodiment, a period of the control signal $t_2$ is the same as that of the reference signal. Since the control signal $t_2$ is synchronized with the reference signal, the second composite signal can be obtained. As shown in FIG. 5H, signal components $+Vd_1$ and $+Vd_2$ occur alternately every one period of the reference signal in the second composite signal. Therefore, the second composite signal is shown as $Vd_1+Vd_2$.

On the other hand, the composite signal Va is also processed according to a third control signal $t_3$ in synchronism with the reference signal such that the composite signal Va is polarity-reversed every one period of the reference signal to obtain a third composite signal, as shown in FIG. 5F. That is, the polarity of the composite signal Va is not reversed at a level H of the control signal $t_3$ shown in FIG. 5E, but is reversed at a level L of the control signal $t_3$. The control signal $t_3$ provided from the control signal generator 35A has the same period as the control signal $t_1$, but is in out of phase relation to the control signal $t_1$ by 90 degrees. As shown in FIG. 5F, signal components $+Vd_1$ and $-Vd_2$ occur alternately every one period of the reference signal in the third composite signal. Therefore, the third composite signal is shown as $Vd_1-Vd_2$.

The composite signals $Vd_1+Vd_2$ and $Vd_1-Vd_2$ are sent to an operating unit 5A comprising a first low-pass filter 51A for integrating the composite signal $Vd_1-Vd_2$ to provide a signal $V_1-V_2$, a second low-pass filter 52A for integrating the composite signal $Vd_1+Vd_2$ to provide a signal $V_1+V_2$, and a divider circuit 54A for dividing the signal $V_1-V_2$ by the signal $V_1+V_2$. An output of the divider circuit 54A, i.e., $(V_1-V_2)/(V_1+V_2)$, is used as a distance signal indicative of the displacement between the light spot P on the object OBJ and a standard position S. In this embodiment, since only one switching circuit 33A is used, it is possible to decrease the occurrence of switching noises to improve the accuracy of measurement.

Figure 6:
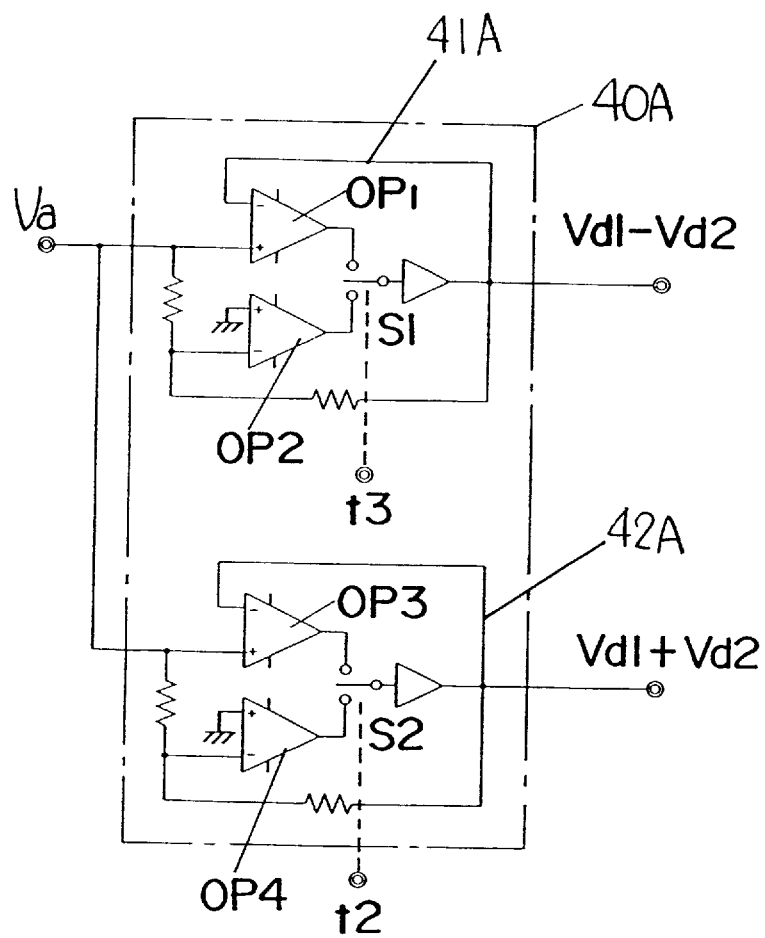
FIG. 6 is a circuit diagram of a detecting unit used in the system of the second embodiment.

Concretely, the detector 40A has a first circuit 41A for providing the composite signal $Vd_1-Vd_2$ and a second circuit 42A for providing the composite signal $Vd_1+Vd_2$, as shown in FIG. 6. The first circuit 41A has an operational amplifier OP1 for non-inverting and amplifying the composite signal Va, an operational amplifier OP2 for inverting and amplifying the composite signal Va, and a switch S1 for switching outputs of the operational amplifiers OP1 and OP2 according to the control signal $t_3$ to provide the composite signal $Vd_1-Vd_2$. Similarly, the second circuit 42A has an operational amplifier OP3 for non-inverting and amplifying the composite signal Va, an operational amplifier OP4 for inverting and amplifying the composite signal Va, and a switch S2 for switching outputs of the operational amplifiers OP3 and OP4 according to the control signal $t_2$ to provide the composite signal $Vd_1+Vd_2$.

Figure 7:
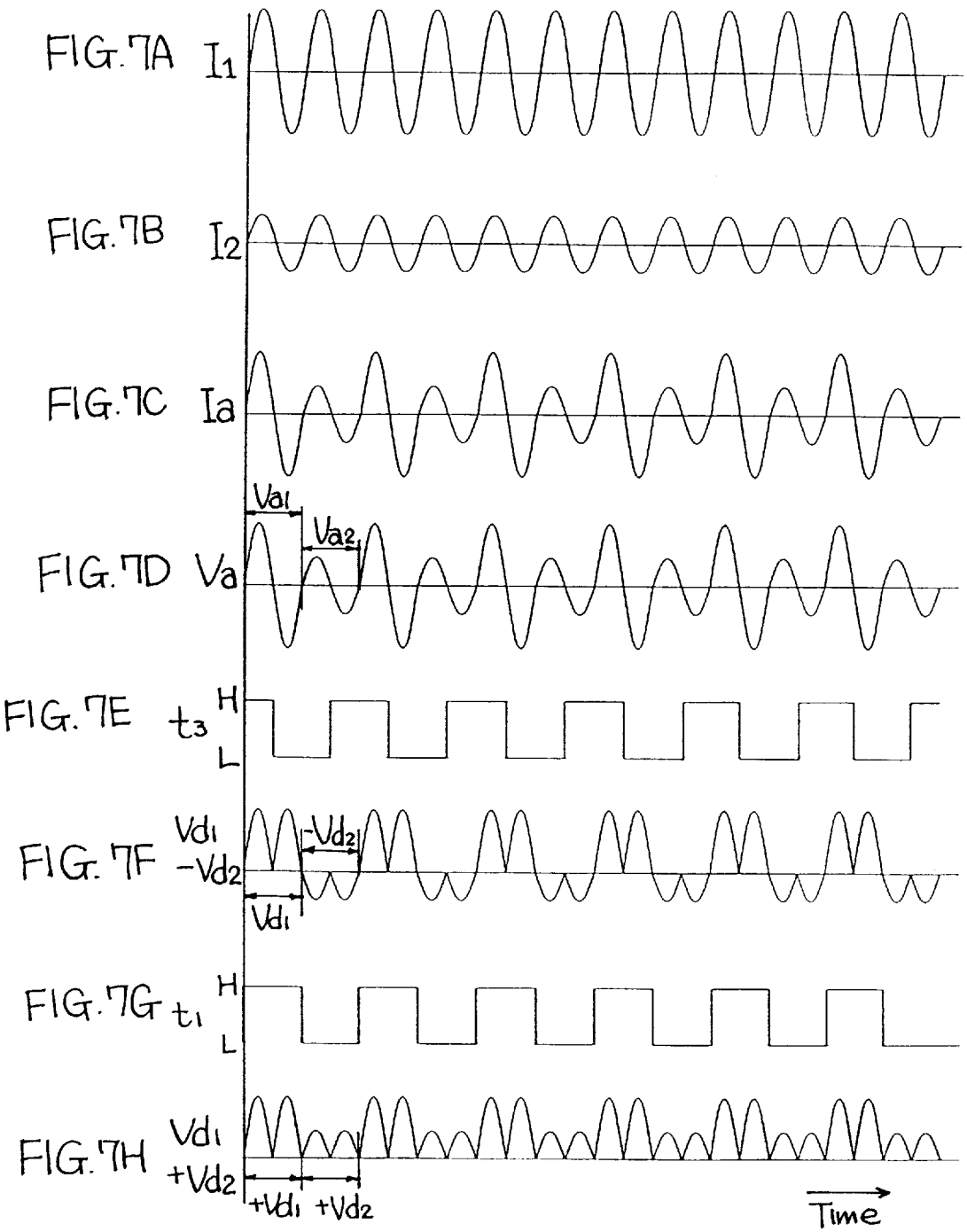
FIGS. 7A to 7H show waveforms explaining operations performed in a detecting unit of a first modification of the second embodiment.

As a first modification of the second embodiment, a detector 40A' can be used in place of the detector 40A. Waveforms of FIGS. 7A to 7D are the same as those of FIGS. 5A to 5D. By the detector 40A', the composite signal Va is processed according to the third control signal $t_3$ such that the composite signal Va is polarity-reversed alternately every one period of the reference signal to obtain a second composite signal, as shown in FIG. 7F. That is, the polarity of the composite signal Va is not reversed at a level H of the control signal $t_3$ shown in FIG. 7E, but is reversed at a level L of the control signal $t_3$. As shown in FIG. 5F, signal components $+Vd_1$ and $-Vd_2$ occur alternately every one period of the reference signal in the second composite signal. Therefore, the second composite signal is shown as $Vd_1-Vd_2$.

The composite signal $Vd_1-Vd_2$ is then processed according to the control signal $t_1$ such that the composite signal $Vd_1-Vd_2$ is polarity-reversed every one period of the reference signal to obtain a third composite, as shown in FIG. 7H. That is, the signal component $+Vd_1$ of the second composite signal $Vd_1-Vd_2$ is not polarity-reversed at a level H of the control signal $t_1$ shown in FIG. 7G. On the other hand, at a level L of the control signal $t_1$, the signal component $-Vd_2$ of the composite signal $Vd_1-Vd_2$ is polarity-reversed. As shown in FIG. 7H, signal components $+Vd_1$ and $+Vd_2$ occur alternately every one period of the reference signal in the third composite signal. Therefore, the third composite signal is shown as $Vd_1+Vd_2$.

Figure 8:
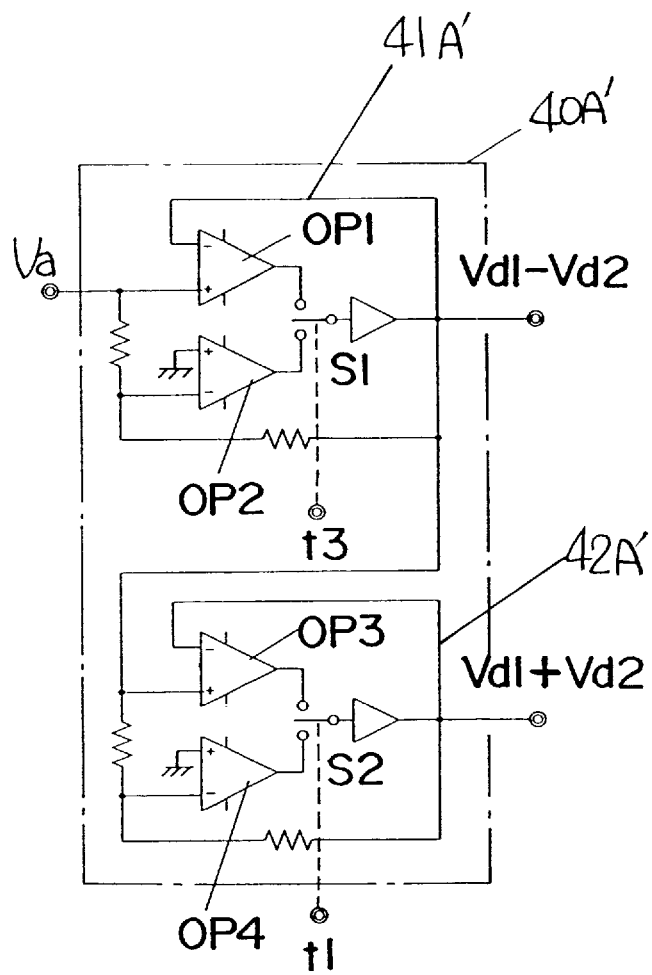
FIG. 8 is a circuit diagram of the detecting unit of the first modification.

Concretely, the detector 40A' has a first circuit 41A' for providing the composite signal $Vd_1-Vd_2$ and a second circuit 42A' for providing the composite signal $Vd_1+Vd_2$, as shown in FIG. 8. The first circuit 41A' has an operational amplifier OP1 for non-inverting and amplifying the composite signal Va, an operational amplifier OP2 for inverting and amplifying the composite signal Va, and a switch S1 for switching outputs of the operational amplifiers OP1 and OP2 according to the control signal $t_3$ to provide the composite signal $Vd_1-Vd_2$. The second circuit 42A' has an operational amplifier OP3 for non-inverting and amplifying the composite signal $Vd_1-Vd_2$, an operational amplifier OP4 for inverting and amplifying the composite signal $Vd_1-Vd_2$, and a switch S2 for switching outputs of the operational amplifiers OP3 and OP4 according to the control signal $t_1$ to provide the composite signal $Vd_1+Vd_2$.

Figure 9:
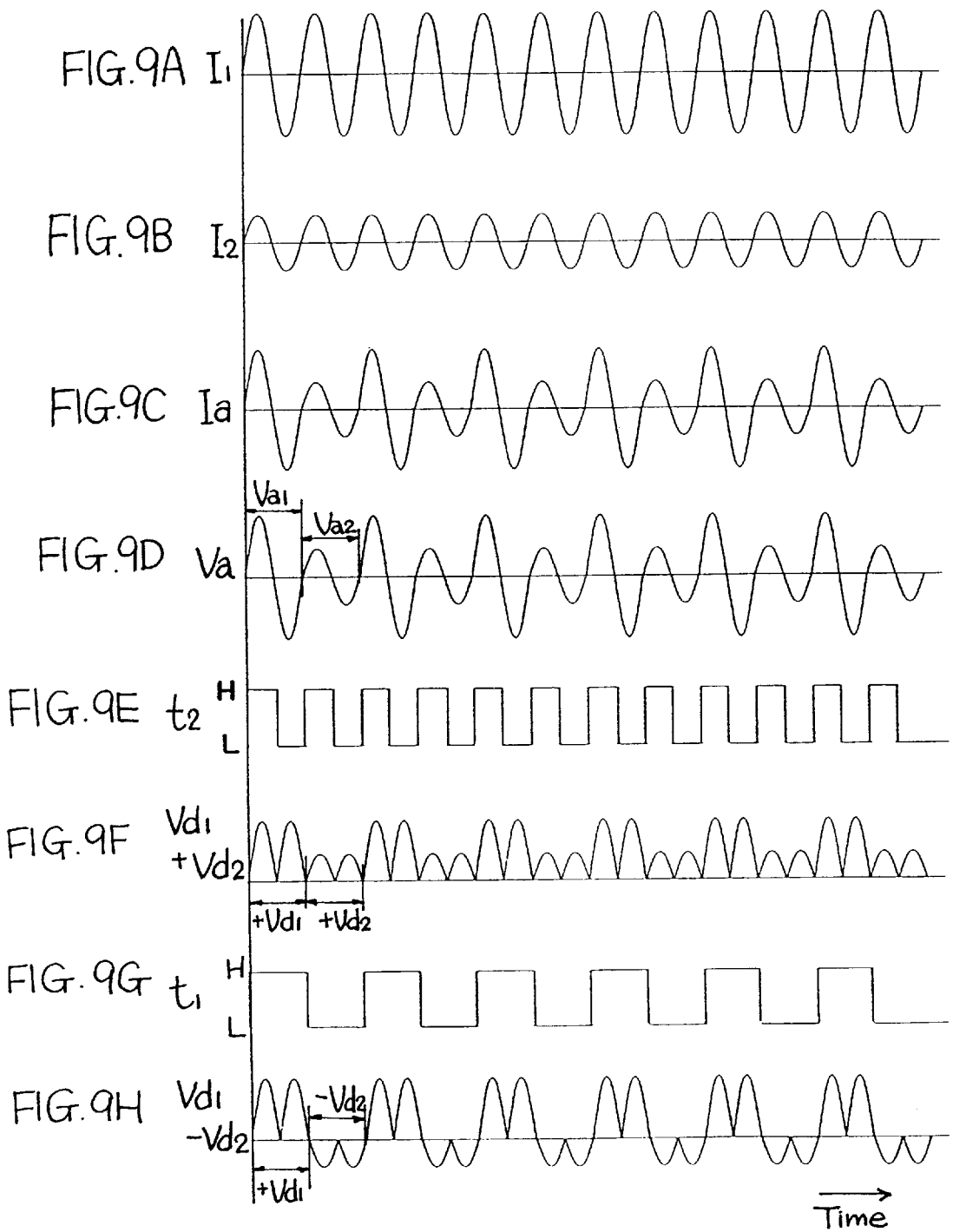
FIGS. 9A to 9H show waveforms explaining operations performed in a detecting unit of a second modification of the second embodiment.

As a second modification of the second embodiment, a detector 40A" can be used in place of the detector 40A. Waveforms of FIGS. 9A to 9D are the same as those of FIGS. 5A to 5D. By the detector 40A", the composite signal Va is processed according to the control signal $t_2$ such that the composite signal Va is polarity-reversed every half period of the reference signal to obtain a second composite signal, as shown in FIG. 9F. That is, the polarity of the composite signal Va is not reversed at a level H of the control signal $t_2$ shown in FIG. 9E, but is reversed at a level L of the control signal $t_2$. As shown in FIG. 9F, signal components $+Vd_1$ and $+Vd_2$ occur alternately every one period of the reference signal in the second composite signal. Therefore, the second composite signal is shown as $Vd_1+Vd_2$.

The composite signal $Vd_1+Vd_2$ is processed according to the control signal $t_1$ such that the composite signal $Vd_1+Vd_2$ is polarity-reversed every one period of the reference signal to obtain a third composite signal, as shown in FIG. 9H. That is, the signal component $Vd_1$ of the composite signal $Vd_1+Vd_2$ is not polarity-reversed at a level H of the control signal $t_1$ shown in FIG. 9G. On the other hand, at a level L of the control signal $t_1$, the signal component $Vd_2$ of the composite signal $Vd_1+Vd_2$ is polarity-reversed. As shown in FIG. 9H, signal components $+Vd_1$ and $-Vd_2$ occur alternately every one period of the reference signal in the third composite signal. Therefore, the third composite signal is shown as $Vd_1-Vd_2$.

Figure 10:
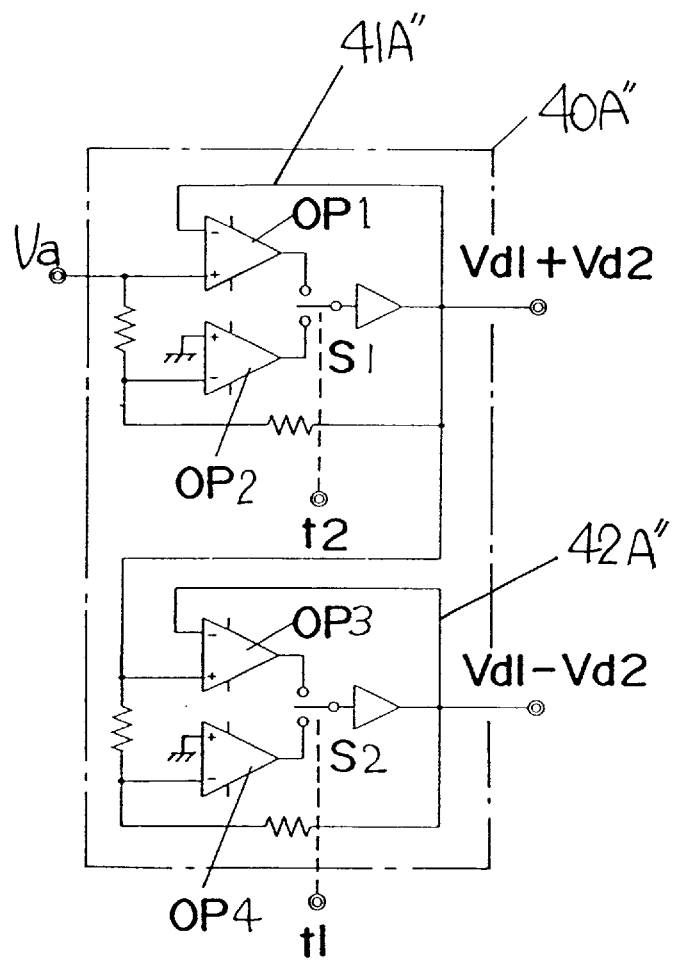
FIG. 10 is a circuit diagram of the detecting unit of the second modification.

Concretely, the detector 40A" has a first circuit 41A" for providing the composite signal $Vd_1+Vd_2$ and a second circuit 42A" for providing the composite signal $Vd_1-Vd_2$, as shown in FIG. 10. The first circuit 41A" has an operational amplifier OP1 for non-inverting and amplifying the composite signal Va, an operational amplifier OP2 for inverting and amplifying the composite signal Va, and a switch S1 for switching outputs of the operational amplifiers OP1 and OP2 according to the control signal $t_2$ to provide the composite signal $Vd_1+Vd_2$. The second circuit 42A" has an operational amplifier OP3 for non-inverting and amplifying the composite signal $Vd_1+Vd_2$, an operational amplifier OP4 for inverting and amplifying the composite signal $Vd_1+Vd_2$, and a switch S2 for switching outputs of the operational amplifiers OP3 and OP4 according to the control signal $t_1$ to provide the composite signal $Vd_1-Vd_2$.

Since adder and subtracter circuits are not needed in the operating unit 5A by using any one of the detectors 40A, 40A' and 40A", it is possible to simplify components parts of the operating unit 5A, while eliminating a problem of the occurrence of operation errors at the adder and subtracter circuits.

Third Embodiment

Figure 11:
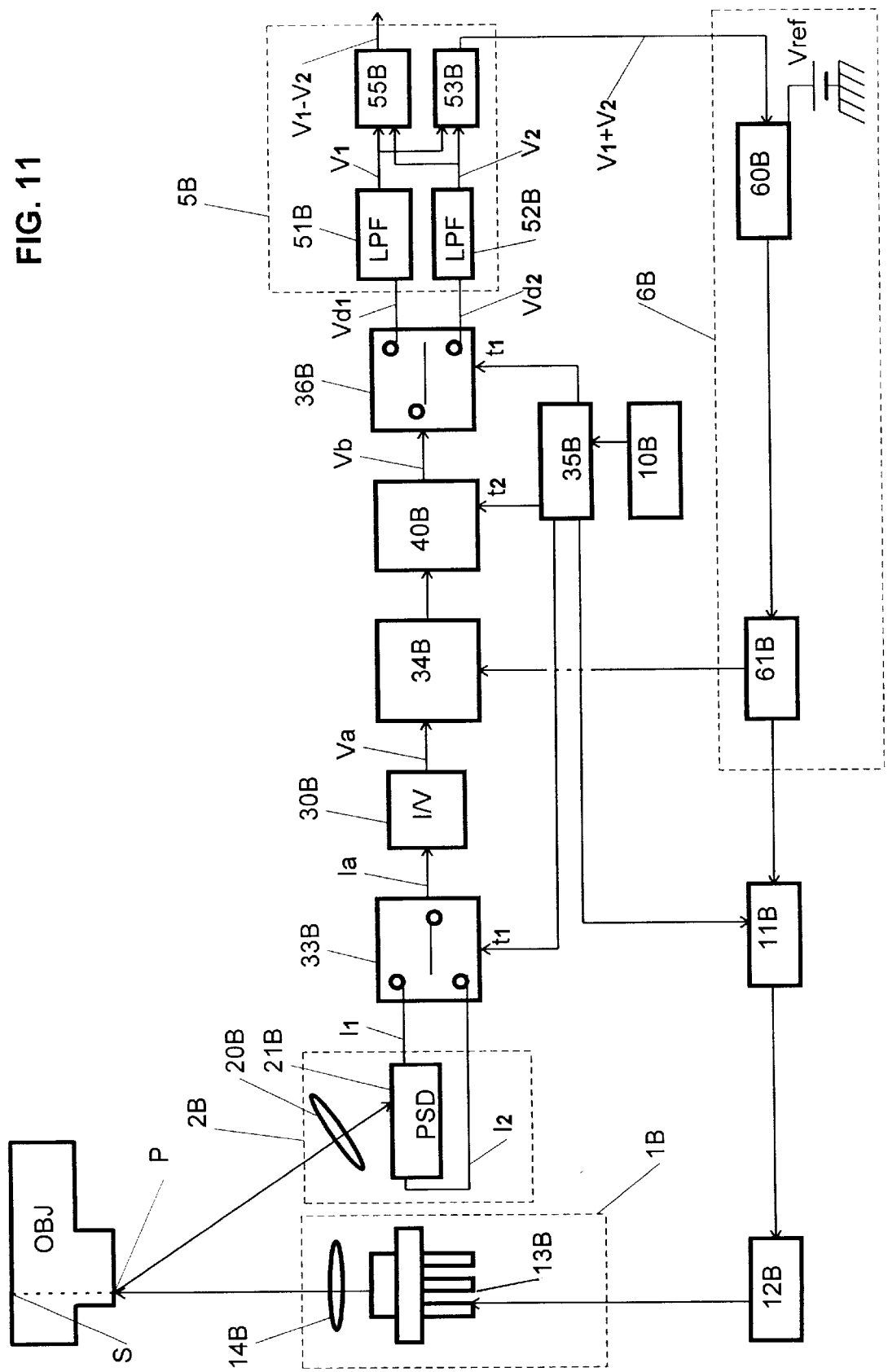
FIG. 11 is a block circuit diagram of an optical displacement measuring system of a third embodiment of the present invention.

As shown in FIG. 11, an optical displacement measuring system of the third embodiment comprises a projecting unit 1B for emitting a laser beam, which is amplitude-modulated by a reference signal having a predetermined period, to an object OBJ, and a receiving unit 2B for receiving light reflected back from the object. The projecting and receiving units 1B and 2B are substantially same as those of the first embodiment. Therefore, no duplicate explanation to common parts and operation is deemed necessary. Like parts are designated by like numerals with a suffixed letter of B.

Figure 12:
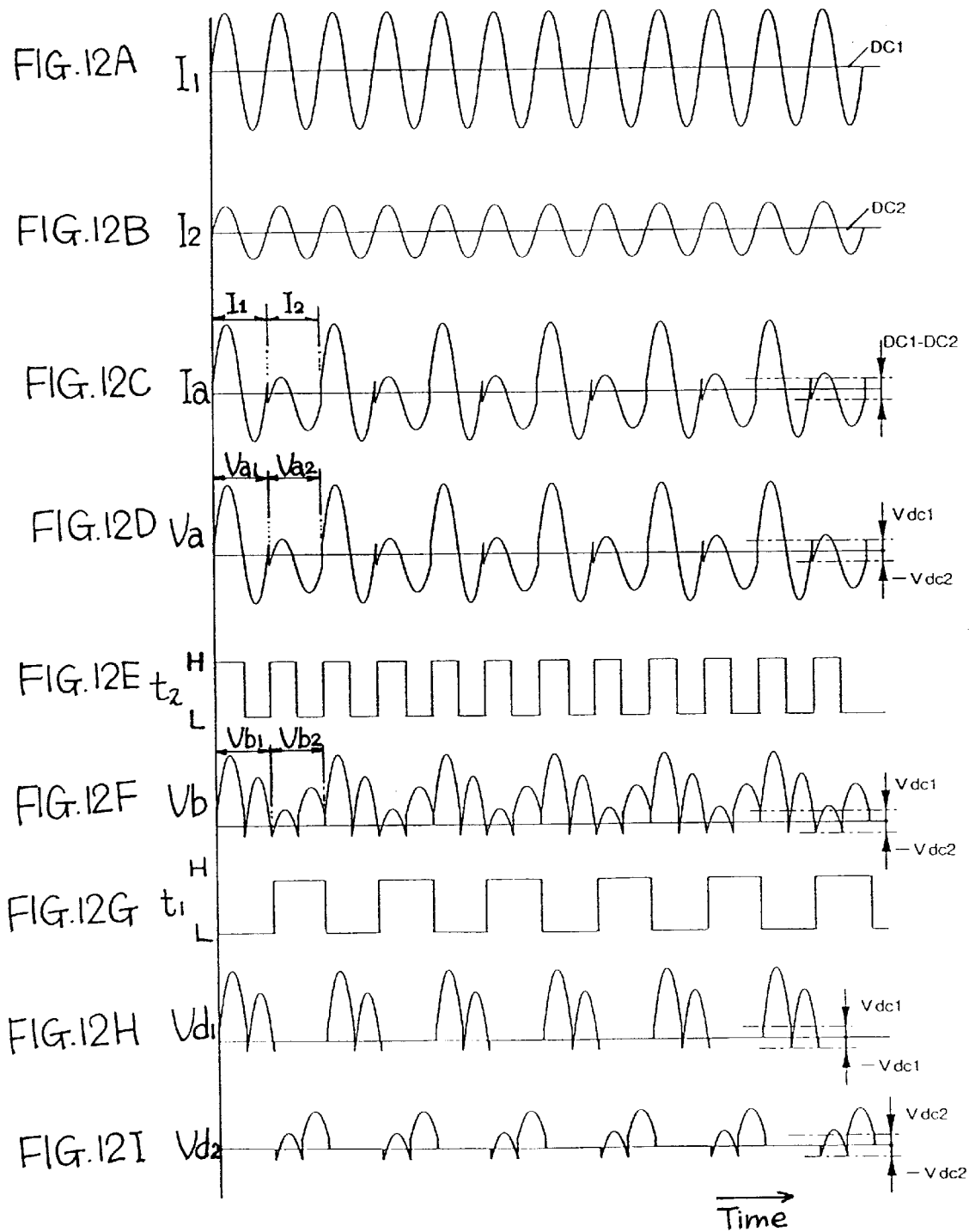
FIGS. 12A to 12I show waveforms explaining operations performed in the circuit diagram of FIG. 11.
Figure 13:
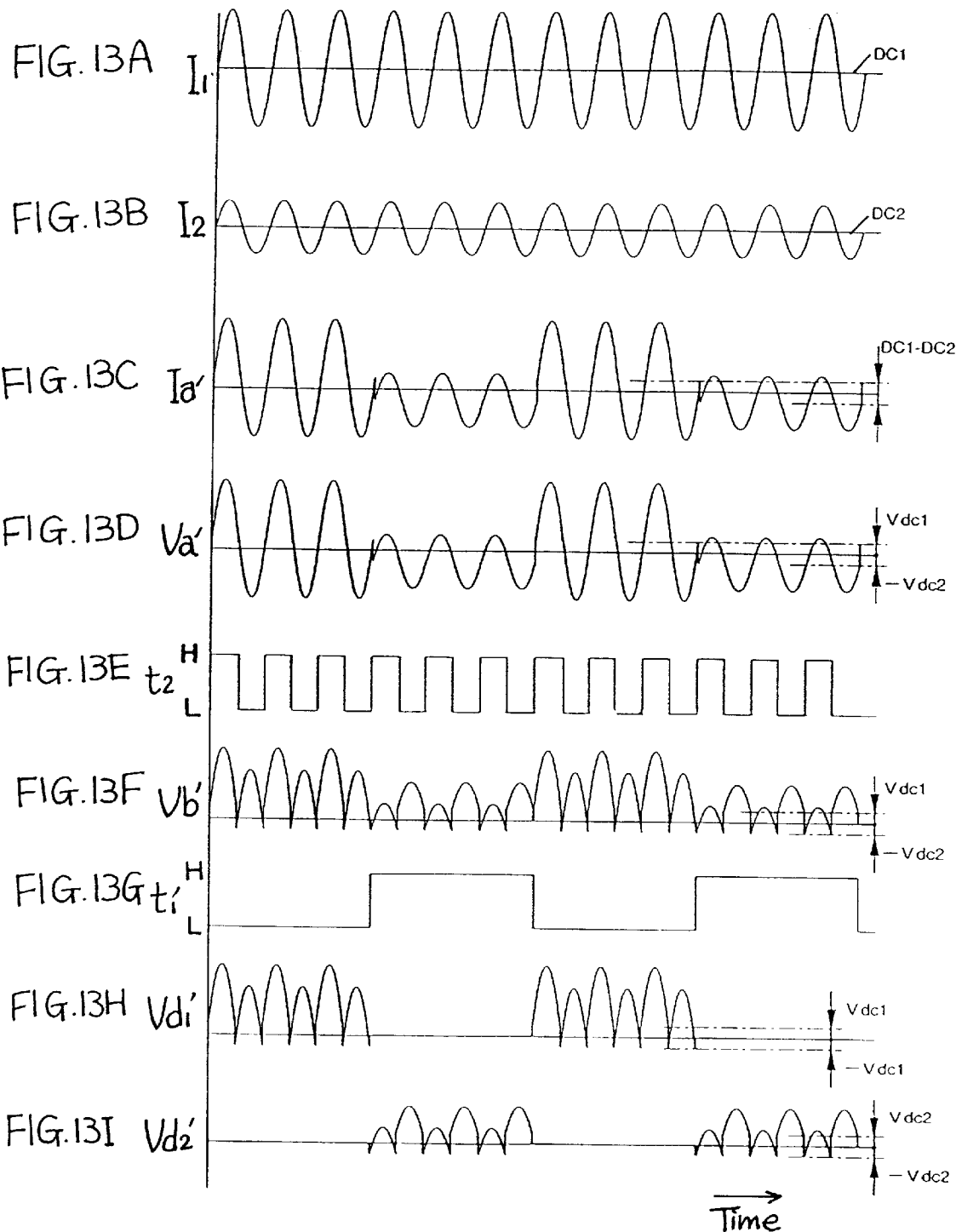
FIGS. 13A to 13I show waveforms explaining another operations performed in the circuit diagram of FIG. 11.

In the first and second embodiments, it is assumed that the PSD (21 and 21A) receives only the reflected light from the object OBJ. However, since the displacement measuring system is generally used in the present of disturbance light such as sunlight or light from a fluorescent lamp, a position sensitive device (PSD) 21B receives the influence of disturbance light. That is, direct-current components DC1 and DC2 are included in a pair of position signals $I_1$ and $I_2$ provided from the PSD 21B, respectively, as shown in FIGS. 12A and 12B. The signals $I_1$ and $I_2$ are processed by a first switching circuit 33B in a time sharing manner according to a first control signal $t_1$ in synchronism with the reference signal to obtain a first composite signal Ia in which the position signals $I_1$ and $I_2$ occur alternately every one period of the reference signal, as shown in FIG. 12C. That is, one-period component of the position signal $I_1$ is extracted at a level L of the control signal $t_1$ shown in FIG. 12G and one-period component of the signal $I_2$ is extracted at a level H of the control signal $t_1$. Since the first control signal $t_1$ is synchronized with the reference signal, the composite signal Ia can be obtained. The control signal $t_1$ is provided from a control signal generator 35B. In this embodiment, the period of the control signal $t_1$ is two times as long as the period of the reference signal. The direct-current components DC1 and DC2 in the position signals $I_1$ and $I_2$ are mixed by the first switching circuit 33B, so that the composite signal Ia contains a difference of the direct current components DC1–DC2, as shown in FIG. 12C.

The composite signal Ia is converted into a voltage signal Va by an I/V converter 30B. Therefore, the signal Va is a composite voltage signal, in which signal components $Va_1$ and $Va_2$ occur alternately every one period of the reference signal, as shown in FIG. 12D. In addition, the signal Va contains a difference of offset voltage $Vdc_1$–$Vdc_2$ corresponding to the difference of the direct current components DC1–DC2.

The signal Va is amplified at a desired amplification rate by an amplifier 34B, and then input into a detector 40B. By the detector 40B, the signal Va is processed according to a control signal $t_2$ in synchronism with the reference signal to obtain a second composite signal Vb, in which the signal Va is polarity-reversed every half period of the reference signal, as shown in FIG. 12F. That is, the polarity of the signal Va is not reversed at a level H of the control signal $t_2$ shown in FIG. 12E, but is reversed at a level L of the control signal $t_2$. In this embodiment, a period of the control signal $t_2$ is the same as the period of the reference signal. As shown in FIG. 12F, signal components $Vb_1$ and $Vb_2$ occur alternately every one period of the reference signal in the composite signal Vb. In addition, offset-cancel voltages $-Vdc_1$ and $-Vdc_2$ having the opposite polarity of the offset voltages $Vdc_1$ and $Vdc_2$ in the signal Va are generated by the detector 40B, and are contained in the signal components $Vb_1$ and $Vb_2$ of the composite signal Vb, respectively.

The composite signal Vb is divided into a pair of pulse signals $Vd_1$ and $Vd_2$ in a time sharing manner according to the control signal $t_1$ by a second switching circuit 36B, as shown in FIG. 12H and 12I. That is, only the signal component $Vb_1$ of the composite signal Vb is extracted at the level L of the control signal $t_1$ to obtain the pulse signal $Vd_1$. Similarly, only the signal component $Vb_2$ of the composite signal Vb is extracted at the level H of the control signal $t_1$ to obtain the pulse signal $Vd_2$. The pulse signals $Vd_1$ and $Vd_2$ are sent to an operating unit 5B comprising a first low-pass filter 51B for integrating the pulse signal $Vd_1$ to provide a signal $V_1$, a second low-pass filter 52B for integrating the pulse signal $Vd_2$ to provide a signal $V_2$, and an adder 53B for calculating a sum of the signals $V_1$ and $V_2$, and a subtracter 55B for calculating a difference between the signals $V_1$ and $V_2$. When the pulse signal $Vd_1$ is integrated by the low-pass filter 51B, the offset voltage $Vdc_1$ is canceled by the offset-cancel voltage $-Vdc_1$. Similarly, when the signal $Vd_2$ is integrated by the low-pass filter 52B, the offset voltage $Vdc_2$ is canceled by the offset-cancel voltage $-Vdc_2$. Therefore, the influence of disturbance light is removed from the signals $V_1$ and $V_2$ of the low-pass filters 51B and 52B.

In this embodiment, since an output $V_1+V_2$ of the adder 53B is controlled by a feed-back unit 6B in the same manner as the first embodiment, an output $V_1-V_2$ of the subtracter 54B can be used as a distance signal indicative of the displacement between the light spot P on the object OBJ and a standard position S. However, when the feed-back unit 6B is not used, a divider circuit for dividing the output $V_1-V_2$ by the output $V_1+V_2$ is necessary to obtain the distance signal.

Thus, even if the position signal $I_1$ and $I_2$ receives the influence of disturbance light, the present system can remove the noise components, i.e., the direct-current components DC1 and DC2, from the distance signal indicative of the displacement to improve the accuracy of measurement.

In this embodiment, the position signals $I_1$ and $I_2$ are processed by the first switching circuit 33B according to the first control signal $t_1$ to obtain the composite signal Ia in which the position signals $I_1$ and $I_2$ occur alternately every one period of the reference signal, as shown in FIG. 12C. However, it is possible to process the position signals $I_1$ and $I_2$ in a time sharing manner according to another control signal such that the position signals $I_1$ and $I_2$ occur alternately every integral number of the period of the reference signal. As shown in FIGS. 13A to 13I, for example, the position signals $I_1$ and $I_2$ may be processed in a time sharing manner according to a control signal $t_{1'}$ to obtain a composite signal Ia' in which the position signals $I_1$ and $I_2$ occur alternately every three-times period of the reference signal. A period of the control signal $t_{1'}$ is six times as long as the period of the reference signal. By using the control signal $t_{1'}$, it is possible to reduce the occurrence of switching noises at the switching circuits 33B and 36B.

Fourth Embodiment

Figure 14:
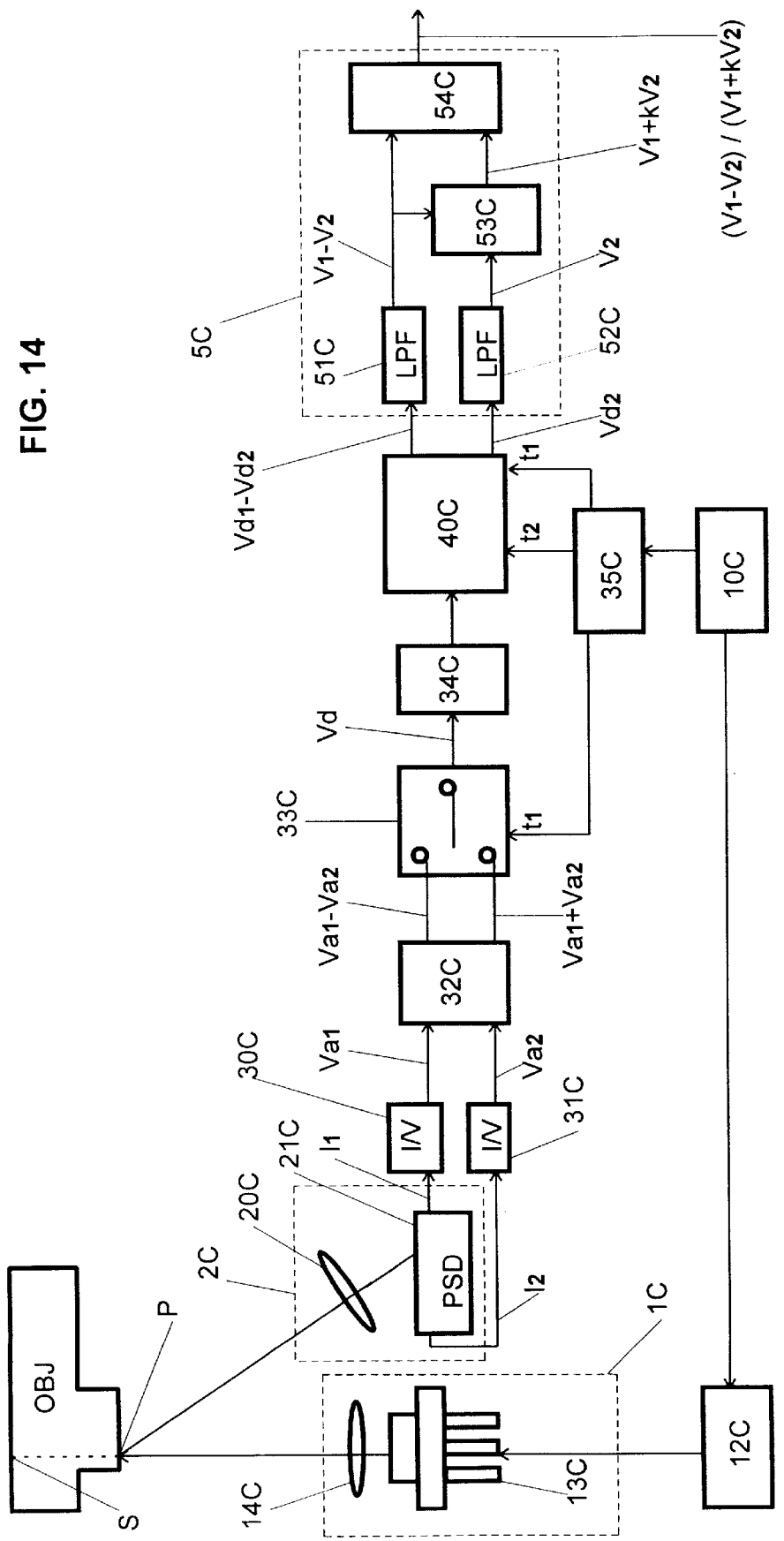
FIG. 14 is a block circuit diagram of an optical displacement measuring system of a fourth embodiment of the present invention.

As shown in FIG. 14, an optical displacement measuring system of the fourth embodiment comprises a light projecting unit 1C for emitting a laser beam, which is amplitude-modulated by a reference signal having a predetermined period, to an object OBJ, and a light receiving unit 2C for receiving light reflected back from the object. The projecting and receiving units 1C and 2C are substantially same as those of the second embodiment. Therefore, no duplicate explanation to common parts and operation is deemed necessary. Like parts are designated by like numerals with a suffixed letter of C.

Figure 15:
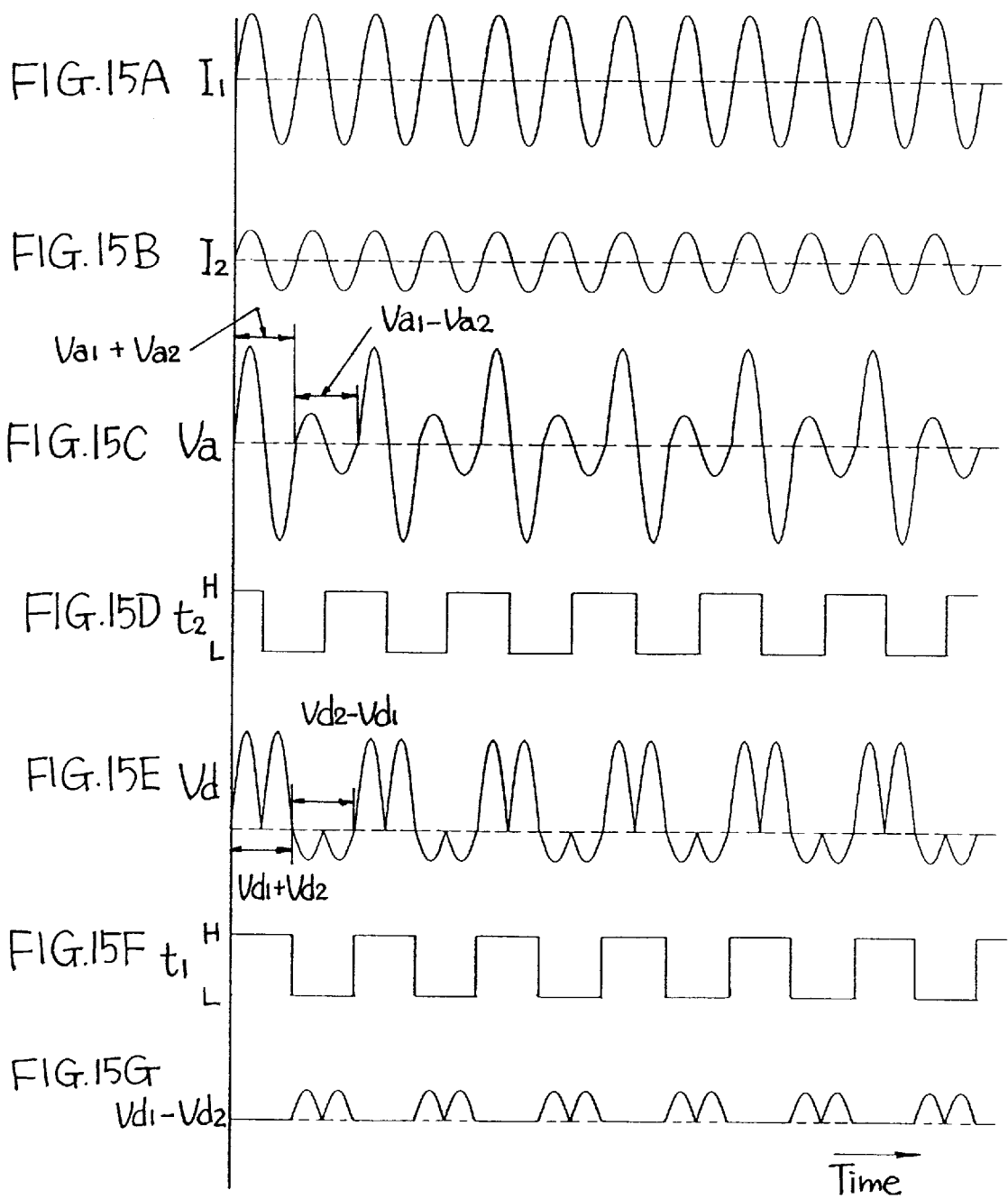
FIGS. 15A to 15G show waveforms explaining operations performed in the circuit diagram of FIG. 14.

As shown in FIGS. 15A and 15B, a pair of position signals $I_1$ and $I_2$ are provided from a position sensitive device (PSD) 21C. The position signals $I_1$ and $I_2$ are converted into voltage signals $Va_1$ and $Va_2$ (not shown) by I/V converters 30C and 31C, respectively. The voltage signals $Va_1$ and $Va_2$ are sent to a first operating unit 32C to calculate a difference between the voltage signals $Va_1$ and $Va_2$ and a sum of the voltage signals $Va_1$ and $Va_2$. Therefore, the first operating unit 32C provides output signals $Va_1-Va_2$ and $Va_1+Va_2$. The signals $Va_1-Va_2$ and $Va_1+Va_2$ are processed by a switching circuit 33C in a time sharing manner according to a first control signal $t_1$ in synchronism with the reference signal to obtain a first composite signal Va in which the signals $Va_1-Va_2$ and $Va_1+Va_2$ occur alternately every one period of the reference signal, as shown in FIG. 15C. That is, one-period component of the signal $Va_1+Va_2$ is extracted at a level H of the control signal $t_1$ shown in FIG. 15F, and on the other hand one-period component of the signal $Va_1-Va_2$ is extracted at a level L of the control signal $t_1$. The control signal $t_1$ is provided from a control signal generator 35C. Since the first control signal $t_1$ is synchronized with the reference signal, the composite signal Va can be obtained. The period of the control signal $t_1$ is two times as long as the period of the reference signal.

The composite signal Va is amplified by an amplifier 34C at a desired amplification rate, and then sent to a detector 40C. By the detector 40C, the composite signal Va is processed according to a control signal $t_2$ in synchronism with the reference signal such that the composite signal Va is polarity-reversed every one period of the reference signal to obtain a second composite signal Vd, as shown in FIG. 15E. That is, the polarity of the composite signal Va is not reversed at a level H of the control signal $t_2$ shown in FIG. 15D, but is reversed at a level L of the control signal $t_2$. The control signal $t_2$ provided from the control signal generator 35C has the same period as the control signal $t_1$, but is in out of phase relation to the control signal $t_1$ by 90 degrees. As shown in FIG. 15E, signal components $Vd_1+Vd_2$ and $Vd_2-Vd_1$ occurs alternately every one period of the reference signal in the composite signal Vd. Subsequently, the composite signal Vd is processed according to the control signal $t_1$ such that only the signal component $Vd_2-Vd_1$ is polarity-reversed, and then extracted to provide a pulse signal $Vd_1-Vd_2$, as shown in FIG. 15G. In addition, the composite signal Vd is integrated to provide a signal $Vd_2$ (not shown). As a result, the detector 40C outputs the signals $Vd_1-Vd_2$ and $Vd_2$. The signal $Vd_1-Vd_2$ and $Vd_2$ are sent to a second operating unit 5C comprising a first low-pass filter 51C for integrating the signal $Vd_1-Vd_2$ to provide a signal $V_1-V_2$, a second low-pass filter 52C for integrating the signal $Vd_2$ to provide a signal $V_2$, an adder circuit 53C for calculating a signal $V_1+k\times V_2$ by the use of the signals $V_1-V_2$ and $V_2$, and a divider circuit 54C for dividing the signal $V_1-V_2$ by the signal $V_1+k\times V_2$. The value "k" is a constant for non-linearity correction. Therefore, a distance signal indicative of a displacement between a light spot P on the object OBJ and a standard position S is determined by the following expression, i.e., $(V_1-V_2)/(V_1+k\times V_2)$.

In this embodiment, the first operating unit 32C provides the output signals $Va_1-Va_2$ and $Va_1+Va_2$. However, as a modification of the fourth embodiment, another operating unit for providing output signals $Va_1$ and $Va_1-Va_2$ may be used in place of the first operating unit 32C.

Fifth Embodiment

Figure 16:
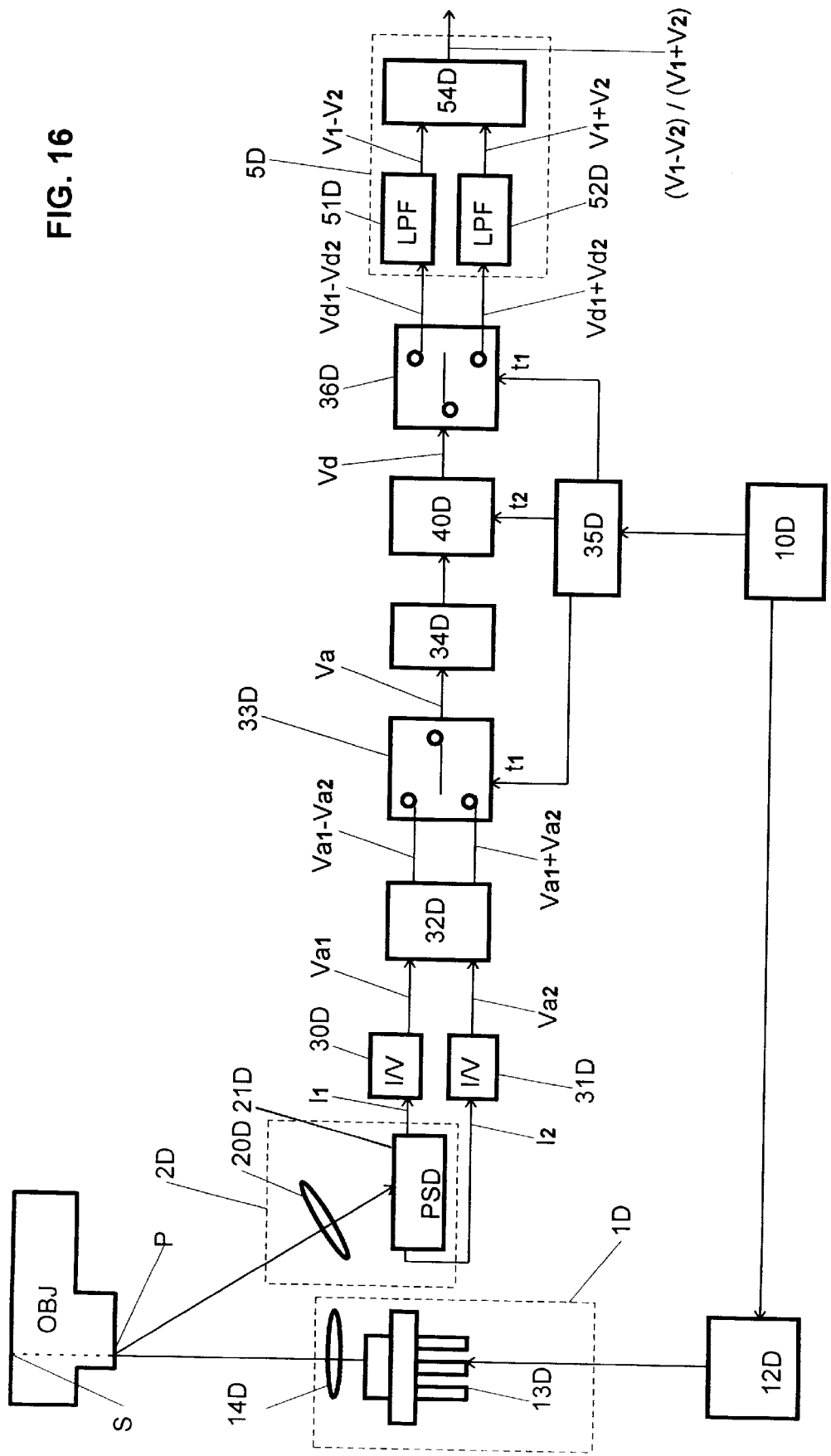
FIG. 16 is a block circuit diagram of an optical displacement measuring system of a fifth embodiment of the present invention.

As shown in FIG. 16, an optical displacement measuring system of the fourth embodiment comprises a light projecting unit 1D for emitting a laser beam, which is amplitude-modulated by a reference signal having a predetermined period, to an object OBJ, and a light receiving unit 2D for receiving light reflected back from the object. The projecting and receiving units 1D and 2D are substantially same as those of the second embodiment. Therefore, no duplicate explanation to common parts and operation is deemed necessary. Like parts are designated by like numerals with a suffixed letter of D.

Figure 17:
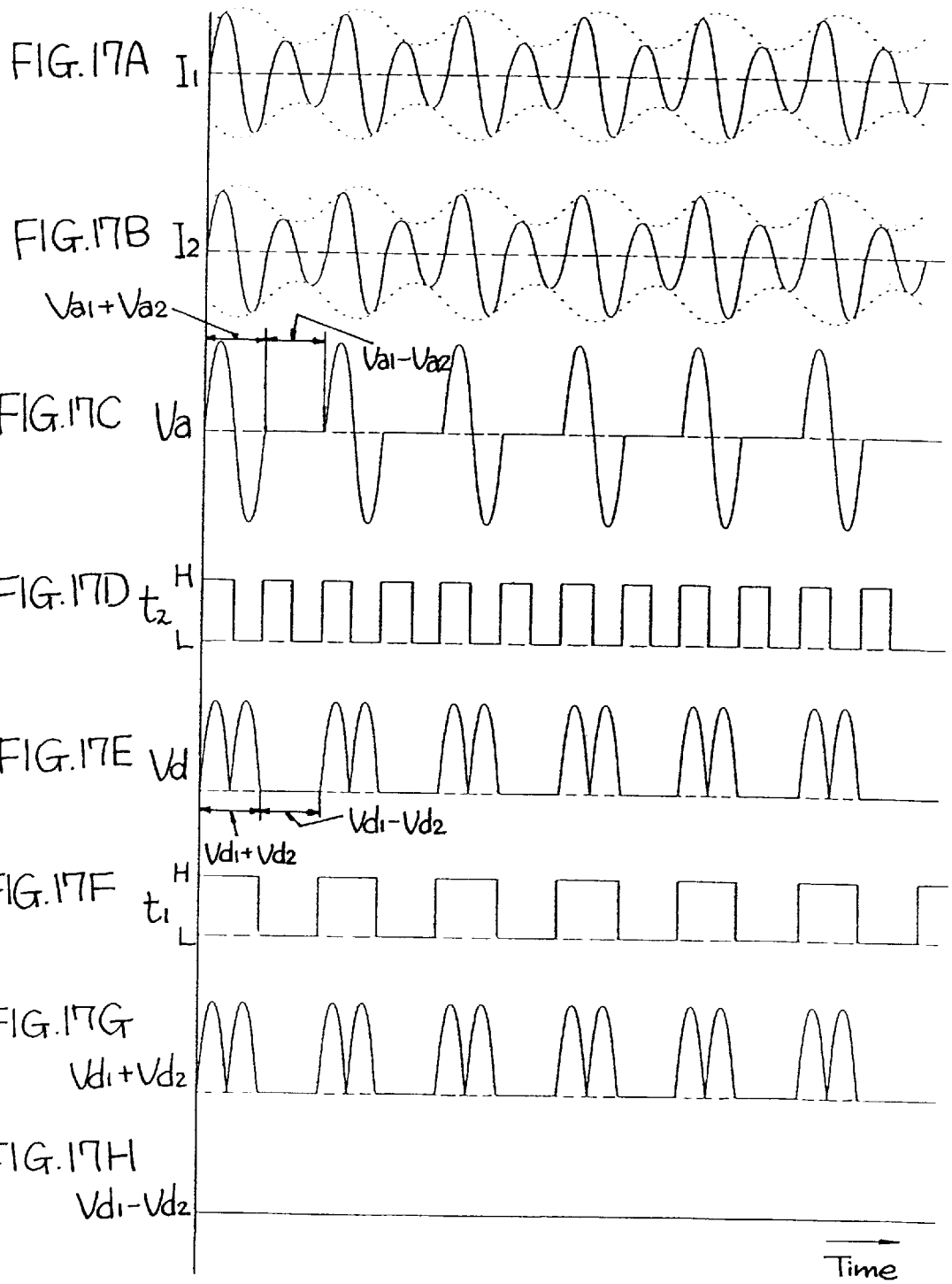
FIGS. 17A to 17H show waveforms explaining operations performed in the circuit diagram of FIG. 16.
Figure 18:
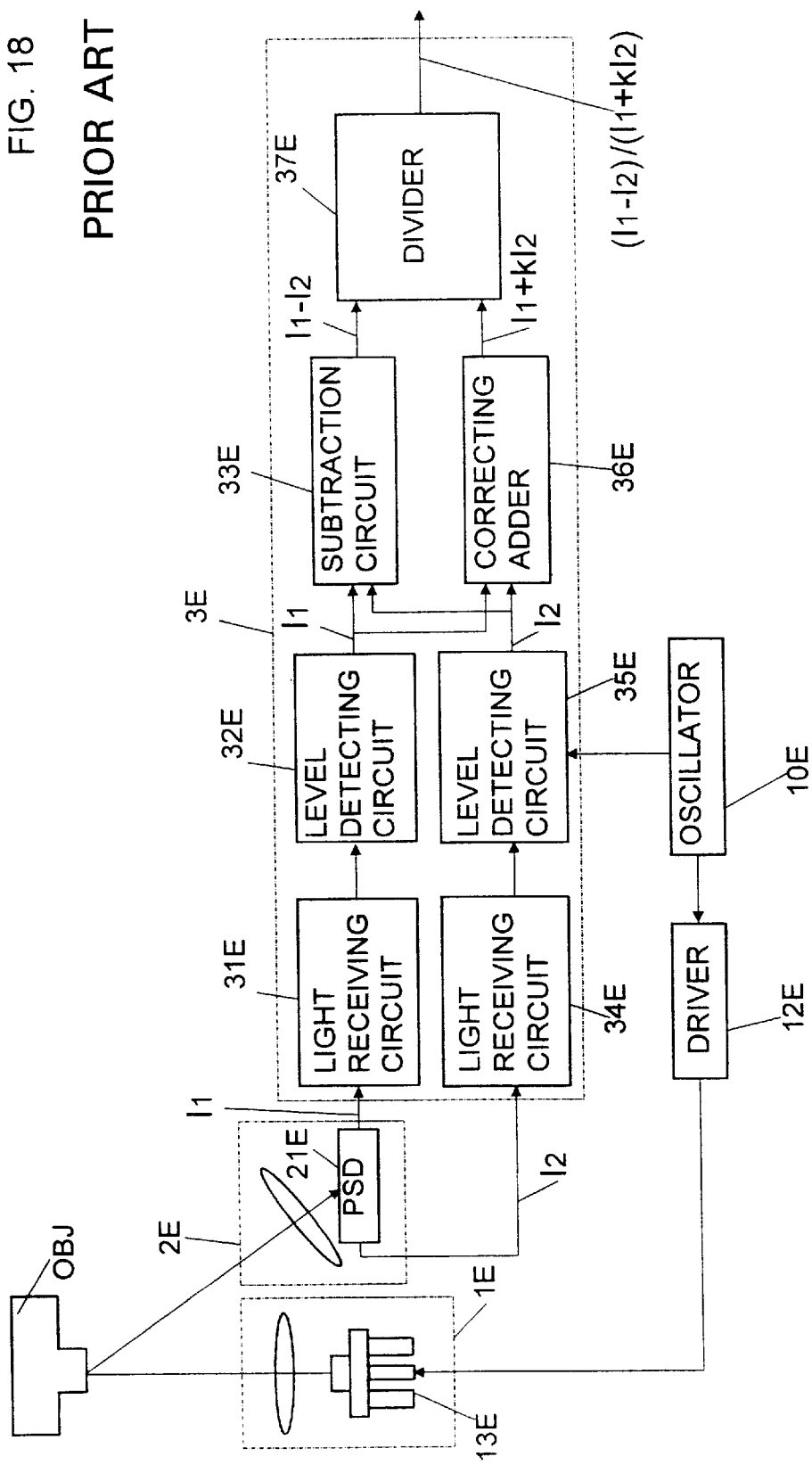
FIG. 18 is a block circuit diagram of an optical displacement measuring system of the prior art.

As shown in FIGS. 17A and 17B, a pair of position signals $I_1$ and $I_2$ are provided from a position sensitive device (PSD) 21D. In this embodiment, the position signals $I_1$ and $I_2$ are amplitude-modulated by the influence of noises. In addition, the position signal $I_1$ is equal to the position signal $I_2$. It means that light reflected back from the object OBJ makes a light spot at the center of an effective length of the PSD 21D. When a high accuracy of measurement is needed, the object OBJ is usually set in the vicinity of the center of the effective length because the center of the effective length of the PSD 21D can provide good response characteristic, and also the occurrence of errors according to a beam size of the laser beam can be suppressed. Therefore, it is very important to improve the accuracy of measurement in the vicinity of the center of the effective length. The position signals $I_1$ and $I_2$ are converted into voltage signals $Va_1$ and $Va_2$ (not shown) by I/V converters 30D and 31D, respectively. The voltage signals $Va_1$ and $Va_2$ are sent to a first operating unit 32D to calculate a difference between the voltage signals $Va_1$ and $Va_2$ and a sum of the voltage signals $Va_1$ and $Va_2$. Therefore, the first operating unit 32D provides output signals $Va_1-Va_2$ and $Va_1+Va_2$. Since the voltage signals $Va_1$ and $Va_2$ are processed by the first operating unit 32D before being sent to a first switching unit 33D, common noise components in the voltage signals $Va_1$ and $Va_2$ can be removed. The output signals $Va_1-Va_2$ and $Va_1+Va_2$ are processed by the first switching circuit 33D in a time sharing manner according to a first control signal $t_1$ in synchronism with the reference signal to obtain a first composite signal Va in which the signals $Va_1-Va_2$ and $Va_1+Va_2$ occur alternately every one period of the reference signal, as shown in FIG. 17C. That is, one-period component of the signal $Va_1-Va_2$ is extracted at a level H of the control signal $t_1$ shown in FIG. 17F, and one-period component of the signal $Va_1-Va_2$ is extracted at a level L of the control signal $t_1$. In this embodiment, the signal $Va_1-Va_2$ is zero. The control signal $t_1$ is provided from a control signal generator 35D. Since the control signal $t_1$ is synchronized with the reference signal, the composite signal Va can be obtained. The period of the control signal $t_1$ is two times as long as the period of the reference signal.

The composite signal Va is amplified by an amplifier 34D at a desired amplification rate, and then sent to a detector 40D. By the detector 40D, the composite signal Va is processed according to a control signal $t_2$ in synchronism with the reference signal to obtain a second composite signal Vd, in which the composite signal Va is polarity-reversed every half period of the reference signal, as shown in FIG. 17E. That is, the polarity of the composite signal Va is not reversed at a level H of the control signal $t_2$ shown in FIG. 17D, but is reversed at a level L of the control signal $t_2$. As shown in FIG. 17E, signal components $Vd_1+Vd_2$ and $Vd_1-Vd_2$ occur alternately every one period of the reference signal in the composite signal Vd. A period of the control signal $t_2$ is the same as the period of the reference signal.

The second composite signal Vd is divided into a pair of pulse signals $Vd_1+Vd_2$ and $Vd_1-Vd_2$ according to the control signal $t_1$ by a second switching circuit 36D, as shown in FIG. 17G and 17H. That is, only the signal component $Vd_1+Vd_2$ of the composite signal Vd is extracted at the level H of the control signal $t_1$ to provide the pulse signal $Vd_1+Vd_2$. On the other hand, only the signal component $Vd_1-Vd_2$ (=0) of the composite signal Vd is extracted at the level L of the control signal $t_1$. The pulse signals $Vd_1+Vd_2$ and $Vd_1-Vd_2$ are sent to a second operating unit 5D comprising a first low-pass filter 51D for integrating the pulse signal $Vd_1-Vd_2$ to provide a signal $V_1-V_2$, a second low-pass filter 52D for integrating the pulse signal $Vd_1+Vd_2$ to provide a signal $V_1+V_2$, and a divider 54D for dividing the signal $V_1-V_2$ by the signal $V_1+V_2$ to provide a distance signal indicative of a displacement between a light spot P on the object OBJ and a standard position S. Therefore, the distance signal is determined by the following expression, i.e., $(V_1-V_2)/(V_1+V_2)$.

In this embodiment, the voltage signals $Va_1$ and $Va_2$ are input into the first operating unit 32D, therefore, it is required that the current signals $I_1$ and $I_2$ provided from the PSD 21D are converted into the voltage signals $Va_1$ and $Va_2$ by the I/V converters 30D and 31D. However, when the first and second operating unit 32D and 5D are modified to receive the current signals $I_1$ and $I_2$, it is possible to eliminate the use of the I/V converters 30D and 31D from this displacement measuring system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical displacement measuring system using a triangulation comprising:
   a light projecting means for emitting a light beam, which is amplitude-modulated by a reference signal having a predetermined period, to an object;
   a position signal generator for receiving light reflected by said object and providing a pair of first and second position signals;
   a control signal generating means for providing first and second control signals in synchronism with said reference signal;
   a first switching means for processing said first and second position signals in a time sharing manner according to said first control signal to obtain a first composite signal, in which said first and second position signals occur alternately and occur once every n periods of said reference signal, where n is a positive integer;
   a single amplifying means for amplifying said first composite signal at a desired amplification rate; and
   a distance determining means for periodically reversing the polarity of said first composite signal provided from said amplifying means according to said second control signal so as to obtain a second composite signal, and determining a distance between said light projecting means and said object from said second composite signal.

2. An optical displacement measuring system as set forth in claim 1, wherein said distance determining means comprises:
   a single detecting means for processing said first composite signal according to said second control signal such that said first composite signal is polarity-reversed every half period of said reference signal to obtain said second composite signal;
   a second switching means for dividing said second composite signal into a pair of third and fourth position signals according to said first control signal; and
   a first operating means for determining said distance between said light projecting means and said object by using said third and fourth position signals.

3. An optical displacement measuring system as set forth in claim 2, wherein said first operating means outputs a light energy signal indicative of an amount of light energy received by said position signal generator, and wherein said distance determining means comprises:
   a comparing means for comparing said light energy signal with a constant value to provide an analog output signal indicative of a difference therebetween; and
   a feed-back control means for controlling at least one of the amplification rate of said amplifying means and a light output of said light projecting means in accordance with said output signal of said comparing means such that said light energy signal is maintained at the constant value.

4. An optical displacement measuring system as set forth in claim 3, wherein said feed-back control means provides a first feed-back control signal to said amplifying means to increase said amplification rate when said light energy signal is smaller than the constant value, and provides a second feed-back control signal to said light projecting means to reduce said light output when said light energy signal is larger than the constant value.

5. An optical displacement measuring system as set forth in claim 2, wherein said position signal generator comprises:
   a light sensing means for receiving said light reflected by said object and providing a pair of preliminary position signals;
   a second operating means for providing said second position signal which is one of said preliminary position signals and said first position signal indicative of a difference between said preliminary position signals to said first switching means.

6. An optical displacement measuring system as set forth in claim 5, wherein said first operating means comprises:
   a first low-pass filter for integrating said third position signal;
   a second low-pass filter for integrating said fourth position signal;
   an adding means for calculating a sum of outputs of said first and second low-pass filters to obtain a second operation signal, multiplying the output of said second low-pass filter by a correction constant to obtain a third operation signal, and adding said second operation signal to said third operation signal to obtain a fourth operation signal; and
   a dividing means for dividing the output of said first low-pass filter by said fourth operation signal to obtain a fifth operation signal, from which said distance between said light projecting means and said object is determined.

7. An optical displacement measuring system as set forth in claim 2, wherein said first operating means comprises:
   a first low-pass filter for integrating said third position signal;
   a second low-pass filter for integrating said fourth position signal;
   an adding means for calculating a sum of outputs of said first and second low-pass filters to obtain a first operation signal;
   a subtracting means for calculating a difference between the outputs of said first and second low-pass filters to obtain a second operation signal; and
   a dividing means for dividing said second operation signal by said first operation signal to obtain a third operation signal, from which said distance between said light projecting means and said object is determined.

8. An optical displacement measuring system as set forth in claim 2, wherein said position signal generator comprises:
   a light sensing means for receiving said light reflected by said object and providing a pair of preliminary position signals;
   a second operating means for providing said first position signal indicative of a difference between said preliminary position signals, and said second position signal indicative of a sum of said preliminary position signals to said first switching means.

9. An optical displacement measuring system as set forth in claim 8, wherein said first operating means comprises:
   a first low-pass filter for integrating said third position signal;
   a second low-pass filter for integrating said fourth position signal; and
   a divider circuit for dividing an output of said first low-pass filter by an output of said second low-pass filter to obtain a third operation signal, from which said distance between said light projecting means and said object is determined.

10. An optical displacement measuring system as set forth in claim 1, where said position signal generator comprises:

a light sensing means for receiving said light reflected by said object and providing a pair of preliminary position signals which are current signals; and a current/voltage converting means for converting said current signals to corresponding voltage signals.

11. An optical displacement measuring system as set forth in claim 1, wherein said first switching means provides said first composite signal, in which said first and second position signals occur alternately and occur once every one period of said reference signal.

12. An optical displacement measuring system as set forth in claim 11, wherein said distance determining means comprises:

a detecting means for processing said first composite signal according to said second control signal which is in out of phase relation to said first control signal by 90 degrees such that said first composite signal is polarity-reversed every one period of said reference signal to obtain said second composite signal, then extracting a third position signal from said second composite signal according to said first control signal, and integrating said second composite signal to obtain a fourth position signal; and a first operating means for determining said distance between said light projecting means and said object by using said third and fourth position signals.

13. An optical displacement measuring system as set forth in claim 12, wherein said position signal generator comprises:

a light sensing means for receiving said light reflected by said object and providing a pair of preliminary position signals;

a second operating means for providing said first position signal indicative of a difference between said preliminary position signals, and said second position signal indicative of a sum of said preliminary position signals to said first switching means.

14. An optical displacement measuring system as set forth in claim 13, wherein said first operating means comprises:

a first low-pass filter for integrating said third position signal;

a second low-pass filter for integrating said fourth position signal;

an adding means for calculating a sum of outputs of said first and second low-pass filters to obtain a third operation signal, multiplying the output of said second low-pass filter by a correction constant to obtain a fourth operation signal, and adding said third operation signal to said fourth operation signal to obtain a fifth operation signal; and a dividing means for dividing the output of said first low-pass filter by said fifth operation signal to obtain a sixth operation signal, from which said distance between said light projecting means and said object is determined.

15. An optical displacement measuring system as set forth in claim 12, wherein said position signal generator comprises:

a light sensing means for receiving said light reflected by said object and providing a pair of preliminary position signals;

a second operating means for providing said first position signal which is one of said preliminary position signals and said second position signal indicative of a difference between said preliminary position signals to said first switching means.

16. An optical displacement measuring system as set forth in claim 15, wherein said first operating means comprises:

a first low-pass filter for integrating said third position signal;

a second low-pass filter for integrating said fourth position signal;

an adding means for calculating a sum of outputs of said first and second low-pass filters to obtain a second operation signal, multiplying the output of said second low-pass filter by a correction constant to obtain a third operation signal, and adding said second operation signal to said third operation signal to obtain a fourth operation signal; and a dividing means for dividing the output of said first low-pass filter by said fourth operation signal to obtain a fifth operation signal, from which said distance between said light projecting means and said object is determined.

17. An optical displacement measuring system as set forth in claim 11, wherein said control signal generating means further provides a third control signal in synchronism with said reference signal, which is in out of phase relation to said first control signal by 90 degrees.

18. An optical displacement measuring system as set forth in claim 17, wherein said distance determining means comprises:

a detecting means including a first circuit for processing said first composite signal according to said second control signal such that said first composite signal is polarity-reversed every half period of said reference signal to obtain a third position signal, and a second circuit for processing said first composite signal according to said third control signal such that said first composite signal is polarity-reversed every one period of said reference signal to obtain a fourth position signal; and a first operating means for determining said distance between said light projecting means and said object by using said third and fourth position signals.

19. An optical displacement measuring system as set forth in claim 18, wherein said first operating means comprises:

a first low-pass filter for integrating said third position signal; and a second low-pass filter for integrating said fourth position signal; and a divider circuit for dividing an output of said second low-pass filter by an output of said first low-pass filter to obtain an operation signal, from which said distance between said light projecting means and said object is determined.

20. An optical displacement measuring system as set forth in claim 11, wherein said distance determining means comprises:

a detecting means including a first circuit for processing said first composite signal according to said second control signal which is in out of phase relation to said first control signal by 90 degrees such that said first composite signal is polarity-reversed every one period of said reference signal to obtain a third position signal, and a second circuit for processing said third position signal according to said first control signal such that said third position signal is polarity-reversed every one period of said reference signal to obtain a fourth position signal; and a first operating means for determining said distance between said light projecting means and said object by using said third and fourth position signals.

21. An optical displacement measuring system as set forth in claim 20, wherein said first operating means comprises:

a first low-pass filter for integrating said third position signal;

a second low-pass filter for integrating said fourth position signal; and a divider circuit for dividing an output of said first low-pass filter by an output of said second low-pass filter to obtain an operation signal, from which said distance between said light projecting means and said object is determined.

22. An optical displacement measuring system as set forth in claim 11, wherein said distance determining means comprises:

a detecting means including a first circuit for processing said first composite signal according to said second control signal such that said first composite signal is polarity-reversed every half period of said reference signal to obtain a third position signal, and a second circuit for processing said third position signal according to said first control signal such that said third position signal is polarity-reversed every one period of said reference signal to obtain a fourth position signal; and a first operating means for determining said distance between said light projecting means and said object by using said third and fourth position signals.

23. An optical displacement measuring system as set forth in claim 22, wherein said first operational means comprises:

a first low-pass filter for integrating said third position signal;

a second low-pass filter for integrating said fourth position signal; and a divider circuit for dividing an output of said second low-pass filter by an output of said first low-pass filter to obtain an operation signal, from which said distance between said light projecting means and said object is determined.

24. An optical displacement measuring method comprising:

emitting a light beam, which is amplitude-modulated by a reference signal having a predetermined period, to an object;

receiving light reflected by said object and providing a pair of first and second position signals;

providing first and second control signals in synchronism with said reference signal;

processing said first and second position signals in a time sharing manner according to said first control signal to obtain a first composite signal, in which said first and second position signals occur alternately and occur once every n periods of said reference signal, where n is a positive integer;

amplifying said first composite signal at a desired amplification rate;

periodically reversing the polarity of said first composite signal provided from said amplifying means according to said second control signal so as to obtain a second composite signal; and determining a distance between said light projecting means and said object from said second composite signal.

* * * * *